United States Patent
Jones et al.

(10) Patent No.: US 7,208,039 B2
(45) Date of Patent: Apr. 24, 2007

(54) HYPERPLATY CLAYS AND THEIR USE IN PAPER COATING AND FILLING, METHODS FOR MAKING SAME, AND PAPER PRODUCTS HAVING IMPROVED BRIGHTNESS

(75) Inventors: J. Philip E. Jones, Alpharetta, GA (US); Robert J. Pruett, Milledgeville, GA (US); Jun Yuan, Warner Robins, GA (US); Michael J. Garska, Sandersville, GA (US); David O. Cummings, Warthen, GA (US); Bomi M. Bilimoria, Macon, GA (US); Robin Wesley, Ruislip (GB)

(73) Assignee: Imerys Pigments, Inc., Roswell, GA (US)

( * ) Notice: Subject to any disclaimer, the term of this patent is extended or adjusted under 35 U.S.C. 154(b) by 0 days.

(21) Appl. No.: 11/086,575

(22) Filed: Mar. 23, 2005

(65) Prior Publication Data
US 2005/0247418 A1    Nov. 10, 2005

Related U.S. Application Data

(62) Division of application No. 10/233,599, filed on Sep. 4, 2002, now abandoned.

(60) Provisional application No. 60/318,207, filed on Sep. 7, 2001.

(51) Int. Cl.
*C09C 1/00* (2006.01)
*C09C 1/34* (2006.01)
*C04B 14/04* (2006.01)

(52) U.S. Cl. .................. 106/486; 106/416; 106/454
(58) Field of Classification Search ........... 106/416, 106/484, 486
See application file for complete search history.

(56) References Cited

U.S. PATENT DOCUMENTS

| 2,158,987 A | 5/1939 | Maloney |
| 2,414,391 A | 1/1947 | Peaker |
| 2,531,396 A | 11/1950 | Carter et al. |

(Continued)

FOREIGN PATENT DOCUMENTS

CA    2 089 613    9/1993

(Continued)

OTHER PUBLICATIONS

English-language machine translation of FR 1 299 089, published Jul. 20, 1962, from AltaVista's Babelfish.

(Continued)

*Primary Examiner*—J. A. Lorengo
*Assistant Examiner*—Patricia L. Hailey
(74) *Attorney, Agent, or Firm*—Finnegan, Henderson, Farabow, Garrett and Dunner, L.L.P.

(57) ABSTRACT

The present invention relates to a hydrous kaolin product having improved optical properties, for example, when used in the production of paper products. The present invention comprises an improved barrier coating for paper and a method of making the coated paper. The present invention also comprises an improved method from making filled and coated paper products. The present invention uses a composition comprising kaolin having a shape factor of at least about 70:1, such as at least about 80:1 or at least about 100:1.

34 Claims, 8 Drawing Sheets

U.S. PATENT DOCUMENTS

| | | | |
|---|---|---|---|
| 2,883,356 A | 4/1959 | Gluesenkamp |
| 3,034,859 A | 5/1962 | Gunn et al. |
| 3,171,718 A | 3/1965 | Gunn et al. |
| 3,291,769 A | 12/1966 | Woodford et al. |
| 3,463,350 A | 8/1969 | Unger |
| 3,526,768 A | 9/1970 | Rai et al. |
| 3,615,806 A | 10/1971 | Torock et al. |
| 3,635,662 A | 1/1972 | Lyons |
| 3,663,260 A | 5/1972 | Poppe et al. |
| 3,790,402 A | 2/1974 | Eastes |
| 3,798,044 A | 3/1974 | Whitley et al. |
| 4,082,880 A | 4/1978 | Zboril |
| 4,102,974 A | 7/1978 | Boni |
| 4,125,411 A | 11/1978 | Lyons |
| 4,176,148 A | 11/1979 | Magder et al. |
| 4,183,991 A | 1/1980 | Smiley et al. |
| 4,198,333 A | 4/1980 | von Bonin et al. |
| 4,221,697 A | 9/1980 | Osborn et al. |
| 4,225,496 A | 9/1980 | Columbus et al. |
| 4,227,920 A | 10/1980 | Chapman et al. |
| 4,233,199 A | 11/1980 | Abolins et al. |
| 4,234,469 A | 11/1980 | Ohta et al. |
| 4,241,142 A | 12/1980 | Kaliski et al. |
| 4,243,574 A | 1/1981 | Manwiller |
| 4,250,077 A | 2/1981 | von Bonin et al. |
| 4,251,576 A | 2/1981 | Osborn et al. |
| 4,298,711 A | 11/1981 | Moulson et al. |
| 4,311,635 A | 1/1982 | Pearson |
| 4,359,497 A | 11/1982 | Magder et al. |
| 4,381,948 A | 5/1983 | McConnell et al. |
| 4,409,344 A | 10/1983 | Moulson et al. |
| 4,414,352 A | 11/1983 | Cohen et al. |
| 4,427,450 A | 1/1984 | Kostansek |
| 4,467,057 A | 8/1984 | Dieck et al. |
| 4,528,235 A | 7/1985 | Sacks et al. |
| 4,543,287 A | 9/1985 | Briggs et al. |
| 4,546,126 A | 10/1985 | Breitenfellner et al. |
| 4,582,866 A | 4/1986 | Shain |
| 4,584,333 A | 4/1986 | Prigent et al. |
| 4,708,975 A | 11/1987 | Shain |
| 4,728,478 A | 3/1988 | Sacks et al. |
| 4,795,776 A | 1/1989 | Milner |
| 4,800,103 A | 1/1989 | Jeffs |
| 4,820,761 A | 4/1989 | Saito et al. |
| 4,873,116 A | 10/1989 | Ancker |
| 4,888,315 A | 12/1989 | Bowman et al. |
| 4,918,127 A | 4/1990 | Adur et al. |
| 4,943,324 A | 7/1990 | Bundy et al. |
| 4,966,638 A | 10/1990 | Mudgett |
| 4,981,521 A | 1/1991 | Bettacchi et al. |
| 5,085,707 A | 2/1992 | Bundy et al. |
| 5,104,925 A | 4/1992 | Honda et al. |
| 5,109,051 A | 4/1992 | Kroenke et al. |
| 5,112,782 A | 5/1992 | Brown et al. |
| 5,128,606 A | 7/1992 | Gate et al. |
| 5,153,039 A | 10/1992 | Porter et al. |
| 5,167,707 A | 12/1992 | Freeman et al. |
| 5,168,083 A | 12/1992 | Matthews et al. |
| 5,169,443 A | 12/1992 | Willis et al. |
| 5,214,091 A | 5/1993 | Tanaka et al. |
| 5,234,763 A | 8/1993 | Rosen |
| 5,294,654 A | 3/1994 | Hellstern-Burnell et al. |
| 5,302,404 A | 4/1994 | Rissanen et al. |
| 5,332,493 A | 7/1994 | Ginn et al. |
| 5,411,587 A | 5/1995 | Willis et al. |
| 5,416,151 A | 5/1995 | Tanaka |
| 5,439,558 A | 8/1995 | Bergmann et al. |
| 5,454,865 A | 10/1995 | Ginn et al. |
| 5,516,829 A | 5/1996 | Davis et al. |
| 5,522,924 A | 6/1996 | Smith et al. |
| 5,573,946 A | 11/1996 | Haxell et al. |
| 5,578,659 A | 11/1996 | Anada et al. |
| 5,624,488 A | 4/1997 | Forbus et al. |
| 5,635,279 A | 6/1997 | Ma et al. |
| 5,645,635 A | 7/1997 | Behl et al. |
| 5,665,183 A | 9/1997 | Kresge et al. |
| 5,685,900 A | 11/1997 | Yuan et al. |
| 5,695,608 A | 12/1997 | Yagi et al. |
| 5,700,560 A | 12/1997 | Kotani et al. |
| 5,707,912 A | 1/1998 | Lowe et al. |
| 5,735,946 A | 4/1998 | Bloodworth et al. |
| 5,749,958 A | 5/1998 | Behl et al. |
| 5,810,998 A | 9/1998 | Arrington-Webb et al. |
| 5,846,309 A | 12/1998 | Freeman et al. |
| 5,879,512 A | 3/1999 | McGenity et al. |
| 5,883,173 A | 3/1999 | Elspass et al. |
| 5,897,411 A | 4/1999 | Stark et al. |
| 5,925,454 A | 7/1999 | Bekele |
| 5,948,156 A | 9/1999 | Coutelle et al. |
| 5,952,093 A | 9/1999 | Nichols et al. |
| 6,031,036 A | 2/2000 | Rosenquist et al. |
| 6,087,016 A | 7/2000 | Feeney et al. |
| 6,117,541 A | 9/2000 | Frisk |
| 6,149,723 A | 11/2000 | Pruett et al. |
| 6,186,335 B1 | 2/2001 | Arrington-Webb et al. |
| 6,193,831 B1 | 2/2001 | Overcash et al. |
| 6,232,389 B1 | 5/2001 | Feeney et al. |
| 6,238,793 B1 | 5/2001 | Takahashi et al. |
| 6,245,395 B1 | 6/2001 | Falat et al. |
| 6,262,161 B1 | 7/2001 | Betso et al. |
| RE37,385 E | 9/2001 | Okada et al. |
| 6,312,511 B1 | 11/2001 | Billimoria et al. |
| 6,358,576 B1 | 3/2002 | Adur et al. |
| 6,402,826 B1 | 6/2002 | Yuan et al. |
| 6,416,817 B1 | 7/2002 | Rangwalla et al. |
| 6,447,845 B1 | 9/2002 | Nanavati et al. |
| 6,447,860 B1 | 9/2002 | Mueller et al. |
| 6,465,064 B1 | 10/2002 | Branch |
| 6,531,196 B1 | 3/2003 | Aho et al. |
| 6,537,363 B1 | 3/2003 | Golley et al. |
| 6,545,079 B1 | 4/2003 | Nurmi et al. |
| 6,554,892 B1 | 4/2003 | Manasso et al. |
| 6,564,199 B1 * | 5/2003 | Pruett et al. ................. 106/486 |
| 6,610,137 B2 | 8/2003 | Golley et al. |
| 6,616,749 B1 * | 9/2003 | Husband et al. ............. 106/486 |
| 6,623,866 B2 | 9/2003 | Migliorini et al. |
| 6,632,868 B2 | 10/2003 | Qian et al. |
| 6,758,895 B2 * | 7/2004 | Wesley ....................... 106/486 |
| 6,759,463 B2 | 7/2004 | Lorah et al. |
| 6,790,896 B2 | 9/2004 | Chaiko |
| 6,794,042 B1 | 9/2004 | Merlin et al. |
| 6,808,559 B2 | 10/2004 | Golley et al. |
| 6,814,796 B2 | 11/2004 | Husband et al. |
| 6,838,507 B2 | 1/2005 | Chou et al. |
| 6,841,211 B1 | 1/2005 | Knoll et al. |
| 6,864,110 B2 | 3/2005 | Summers et al. |
| 6,884,450 B2 | 4/2005 | Wu et al. |
| 6,887,302 B2 | 5/2005 | Rajagopalan et al. |
| 6,914,095 B2 | 7/2005 | Lorah et al. |
| 6,942,897 B2 | 9/2005 | Joyce et al. |
| 2003/0187120 A1 | 10/2003 | Chaiko et al. |
| 2004/0033379 A1 | 2/2004 | Grunian et al. |
| 2004/0161594 A1 | 8/2004 | Joyce et al. |
| 2004/0241475 A1 | 12/2004 | Morabito |
| 2004/0250973 A1 | 12/2004 | Johns et al. |
| 2005/0145138 A1 | 7/2005 | Raju et al. |
| 2005/0171243 A1 | 8/2005 | Hemmings et al. |
| 2005/0228096 A1 | 10/2005 | Kirsten et al. |
| 2005/0228104 A1 | 10/2005 | Freeney et al. |

FOREIGN PATENT DOCUMENTS

| | | |
|---|---|---|
| CA | 2 467 284 | 11/2004 |
| DE | 2 241 577 | 3/1973 |

| | | | | | | |
|---|---|---|---|---|---|---|
| DE | 24 49 656 | 12/1975 | | GB | 1375057 | 11/1974 |
| DE | 26 58 814 | 1/1978 | | GB | 1469028 | 3/1977 |
| DE | 28 18 954 | 11/1978 | | GB | 1493393 | 11/1977 |
| DE | 27 39 620 | 3/1979 | | GB | 1 496 088 | 12/1977 |
| DE | 30 12 235 | 10/1980 | | GB | 1513657 | 6/1978 |
| DE | 30 47 269 | 7/1982 | | GB | 1597213 | 9/1981 |
| DE | 36 32 606 | 4/1987 | | GB | 2223758 | 4/1990 |
| DE | 35 36 371 | 5/1987 | | GB | 240398 | 7/1991 |
| DE | 35 40 524 | 5/1987 | | GB | 2 306 392 | 5/1997 |
| DE | 34 66 547 | 11/1987 | | GB | 2310215 | 8/1997 |
| DE | 37 50 864 | 4/1988 | | JP | 51005383 | 1/1976 |
| DE | 38 84 605 | 8/1988 | | JP | 53016063 | 2/1978 |
| DE | 35 65 272 | 11/1988 | | JP | 54010394 | 1/1979 |
| DE | 36 79 147 | 6/1991 | | JP | 54047751 | 4/1979 |
| DE | 43 01 730 | 7/1993 | | JP | 55 129439 | 10/1980 |
| DE | 42 13 746 | 10/1993 | | JP | 55131024 | 10/1980 |
| DE | 36 89 760 | 5/1994 | | JP | 5907 4152 | 4/1984 |
| DE | 100 10 941 | 9/2001 | | JP | 6008 4364 | 1/1985 |
| EP | 0 001 066 | 4/1980 | | JP | 6002 3488 | 2/1985 |
| EP | 0 026 075 | 4/1981 | | JP | 6003 8455 | 2/1985 |
| EP | 0 054 424 | 6/1982 | | JP | 6023 1443 | 8/1985 |
| EP | 0 132 094 | 1/1985 | | JP | 6023 5858 | 11/1985 |
| EP | 0 132 228 | 1/1985 | | JP | 06211 6667 | 5/1987 |
| EP | 0 160 777 | 11/1985 | | JP | 6223 2452 | 10/1987 |
| EP | 0 163 427 | 12/1985 | | JP | 6313 2964 | 6/1988 |
| EP | 0 217 626 | 4/1987 | | JP | 6317 5047 | 7/1988 |
| EP | 0 222 138 | 5/1987 | | JP | 0201 8362 | 1/1990 |
| EP | 0 222 298 | 5/1987 | | JP | 0203 4653 | 2/1990 |
| EP | 0 239 986 | 10/1987 | | JP | 0204 5551 | 2/1990 |
| EP | 0 245 553 | 11/1987 | | JP | 0412 2752 | 4/1992 |
| EP | 0 262 649 | 4/1988 | | JP | 4 270650 | 9/1992 |
| EP | 0 274 888 | 7/1988 | | JP | 0526 2974 | 10/1993 |
| EP | 0 341 981 | 11/1989 | | JP | 0601 6918 | 1/1994 |
| EP | 0 352 714 | 1/1990 | | JP | 0606 5490 | 3/1994 |
| EP | 0 456 363 | 11/1991 | | JP | 06502684 | 3/1994 |
| EP | 0 204 324 | 2/1992 | | JP | 0614 5442 | 5/1994 |
| EP | 0 475 434 | 3/1992 | | JP | 07502068 | 3/1995 |
| EP | 0 524 635 | 1/1993 | | JP | 07 251486 | 10/1995 |
| EP | 0 528 078 | 2/1993 | | JP | 0801 2886 | 1/1996 |
| EP | 0 543 793 | 5/1993 | | JP | 08022945 | 1/1996 |
| EP | 0 586 904 | 3/1994 | | JP | 09 111696 | 4/1997 |
| EP | 0 588 239 | 3/1994 | | JP | 10114854 | 5/1998 |
| EP | 0 589 461 | 3/1994 | | JP | 10 298358 | 11/1998 |
| EP | 0 596 442 | 5/1994 | | JP | 11 129379 | 5/1999 |
| EP | 0 494 594 | 10/1995 | | JP | 11 129381 | 5/1999 |
| EP | 0 691 375 | 1/1996 | | JP | 2000 265391 | 9/2000 |
| EP | 0 764 739 | 3/1997 | | JP | 2000 303386 | 10/2000 |
| EP | 0 804 505 | 11/1997 | | JP | 2000 345032 | 12/2000 |
| EP | 0 824 130 | 2/1998 | | JP | 2001 020200 | 1/2001 |
| EP | 0 991 530 | 4/2000 | | JP | 2001 098149 | 4/2001 |
| EP | 0 991 815 | 4/2000 | | JP | 2002 363885 | 12/2002 |
| EP | 1 088 852 | 4/2001 | | JP | 2003 192861 | 7/2003 |
| EP | 1 245 730 | 10/2002 | | JP | 2003 292678 | 10/2003 |
| EP | 1 484 176 | 12/2004 | | JP | 2004 003118 | 1/2004 |
| EP | 1 512 552 | 3/2005 | | JP | 2004 034390 | 2/2004 |
| FR | 1 299 089 | 7/1962 | | PT | 77224 | 8/1983 |
| FR | 2 150 953 | 4/1973 | | WO | WO 80/01167 | 6/1980 |
| FR | 2 273 040 | 12/1975 | | WO | WO 80/02430 | 10/1980 |
| FR | 2 359 645 | 2/1978 | | WO | WO 90/11605 | 10/1980 |
| FR | 2 359 874 | 2/1978 | | WO | WO 97/32934 | 9/1987 |
| FR | 2 389 645 | 12/1978 | | WO | WO 88/05804 | 8/1988 |
| FR | 2 452 511 | 10/1980 | | WO | WO 93/04119 | 3/1993 |
| FR | 2 558 168 | 7/1985 | | WO | WO 94/07956 | 4/1994 |
| FR | 2 774 689 | 8/1999 | | WO | WO 96/15321 | 5/1996 |
| FR | 2 822 086 | 9/2002 | | WO | WO 96/22329 | 7/1996 |
| GB | 819 050 | 8/1959 | | WO | WO 97/00910 | 1/1997 |
| GB | 1032536 | 6/1966 | | WO | WO 97/34956 | 9/1997 |
| GB | 1 100 496 | 1/1968 | | WO | WO 98/37152 | 8/1998 |
| GB | 1 101 950 | 2/1968 | | WO | WO 98/54409 | 12/1998 |
| GB | 1118723 | 7/1968 | | WO | WO 98/54410 | 12/1998 |
| GB | 1 136 350 | 12/1968 | | WO | WO 98/56598 | 12/1998 |
| GB | 1 241 177 | 7/1971 | | WO | WO 98/56860 | 12/1998 |
| GB | 1 310 933 | 3/1973 | | WO | WO 98/56861 | 12/1998 |

| | | |
|---|---|---|
| WO | WO 98/58613 | 12/1998 |
| WO | WO 99/01504 | 1/1999 |
| WO | WO 99/41309 | 8/1999 |
| WO | WO 99/43747 | 9/1999 |
| WO | WO 99/51815 | 10/1999 |
| WO | WO 99/58613 | 11/1999 |
| WO | WO 00/05311 | 2/2000 |
| WO | WO 00/59840 | 10/2000 |
| WO | WO 00/59841 | 10/2000 |
| WO | WO 00/66657 | 11/2000 |
| WO | WO 00/76862 | 12/2000 |
| WO | WO 00/78540 | 12/2000 |
| WO | WO 01/12708 | 2/2001 |
| WO | WO 01/46307 | 6/2001 |
| WO | WO 01/53159 | 7/2001 |
| WO | WO 01/59215 | 8/2001 |
| WO | WO 01/66627 | 9/2001 |
| WO | WO 01/66635 | 9/2001 |
| WO | WO 01/66655 | 9/2001 |
| WO | WO 01/87580 | 11/2001 |
| WO | WO 01/87596 | 11/2001 |
| WO | WO 02/16509 | 2/2002 |
| WO | WO 03/039228 | 5/2003 |
| WO | WO 2004/046463 | 6/2004 |
| WO | WO 2004/074574 | 9/2004 |
| WO | WO 2005/013704 | 2/2005 |
| WO | WO 2005/014283 | 2/2005 |
| WO | WO 2005/044938 | 5/2005 |
| WO | WO 2005/047372 | 5/2005 |
| WO | WO 2005/061608 | 7/2005 |
| WO | WO 2005/108222 | 11/2005 |

OTHER PUBLICATIONS

English language Derwent Abstract for FR 2 822 086, published Sep. 20, 2002.

English language Derwent Abstract for JP 4 270650, published Sep. 28, 1992.

English language Derwent Abstract for JP 55 129439, published Oct. 7, 1980.

English language Derwent Abstract for JP 07 251486, published Oct. 3, 1995.

English language Derwent Abstract for JP 09 111696, published Apr. 28, 1997.

English language Derwent Abstract for JP 10 298358, published Nov. 10, 1998.

English language Derwent Abstract for JP 11 129381, published May 18, 1999.

English language Derwent Abstract for JP 11 129379, published May 18, 1999.

English language Derwent Abstract for JP 2000 265391, published Sep. 26, 2000.

English language Derwent Abstract for JP 2000 303386, published Oct. 31, 2000.

English language Derwent Abstract for JP 2001 020200, published Jan. 23, 2001.

English language Derwent Abstract for JP 2002 363885, published Dec. 18, 2002.

English language Derwent Abstract for JP 2003 192861, published Jul. 9, 2003.

English language Derwent Abstract for JP 2003 292678, published Oct. 15, 2003.

English language Derwent Abstract for JP 2004 003118, published Jan. 8, 2004.

English language Derwent Abstract for JP 2004 034390, published Feb. 5, 2004.

English language Derwent Abstract for PT 77224, published Aug. 19, 1983.

Brochure: "Kaopaques Delminated Aluminum Silicates for Paint Systems," Georgia Kaolin Co., 433 N. Broad Street, Elizabeth City, NJ 27207, Oct. 1975.

Burgess Malcolm, "Kaolin, a Glaciers Gift to Georgia," 1985.

Clay Minerals Society Home page, http//cms/lanl.gov/instruct.html, "Instructions for Authors, Clays and Clay Minerals," *Instructions for Authors*, p. 4 of 5.

Jennings et al., "Particle size measurement: the equivalent spherical diameter," Proc. R. Soc. Lond., A419, (1988), pp. 137-149.

Jepson, W.P., "Kaolins, their properties and uses," *Phil. Trans. R. Soc. Lond.*, A311, 411-432, 1984.

Swan, A., "Realistic paper tests for various printing processes," *Printing Technology*, 13(1), Apr. 9-22, 1969.

van Olphen, H., Chapter 6 "Clay Mineralogy," Clay Colloid Chemistry (Interscience, 1963), pp. 59-88.

* cited by examiner

Barrier Coating Pigment 5 gals. of coarse fraction kaolin
↓

Adjust solids to 35 %
Add 1 lb/ton C-211 and more if necessary
↓

Batch sand grind to increase 2 micron by 24 to 26 %
Use 3600 ml sand & 1800 ml clay slip
target 55 % < 2 micron
↓

Screen on 325 mesh screen
↓

Flocculate to pH=3 with sulfuric acid
↓

Filter
↓

Reblunge filter cake with SAPA to pH=6.5
↓

Spray dry some reblunged filter cake and add back to slip to
make slurry at 58 to 60 % solids slurry
( 5 lb dry minimum )

---

Results: Brightness, Brookfield and Hercules viscosity, shape factor,
+325 mesh residue & particle size distribution to 0.1 micron

FIGURE 4

HYPERPLATY CLAYS AND THEIR USE IN PAPER COATING AND FILLING, METHODS FOR MAKING SAME, AND PAPER PRODUCTS HAVING IMPROVED BRIGHTNESS

RELATED APPLICATION

This is a divisional of application Ser. No. 10/233,599, filed Sep. 4, 2002 now abandoned, which claims the benefit of priority of U.S. Provisional Application No. 60/318,207, filed Sep. 7, 2001, both of which are incorporated herein by reference.

This nonprovisional application claims the benefit of priority under 35 U.S.C. § 119(e) to U.S. Provisional Application No. 60/318,207, filed Sep. 7, 2001, entitled "THE USE OF HYPERPLATY CLAYS IN PAPER COATINGS AND FILLING, AND PAPER PRODUCTS HAVING IMPROVED BRIGHTNESS," the disclosure of which is incorporated by reference herein in its entirety.

FIELD OF THE INVENTION

The present invention relates to a hydrous kaolin, which provides improved optical properties when used as a filler or coating. Also, the present invention relates to a paper coating and a coated paper product that exhibits improved properties, such as improved brightness. Further, the present invention relates to methods for preparing hydrous kaolin products.

BACKGROUND OF THE INVENTION

Particulate kaolin products find a variety of uses, including as pigments, fillers, and extenders for use in paint, plastics, polymers, papermaking and paper coating. Kaolin clay, also referred to as China Clay, or hydrous kaolin, is comprised predominantly of the mineral kaolinite, a hydrous aluminum silicate, together with small amounts of a variety of impurities.

Particulate kaolins generally exist in three forms: hydrous kaolin, calcined kaolin and chemically aggregated kaolin. Hydrous kaolin is primarily the mineral kaolinite, which has been mined and beneficiated from natural sources. Calcined kaolins are obtained by processing hydrous kaolin at high temperatures, e.g., greater than 500° C. Chemically aggregated kaolins are particle aggregates having a microstructure resembling that of calcined kaolins produced by treating hydrous kaolin with chemicals. Calcined and chemically aggregated kaolins can show benefits in certain application compositions when compared with hydrous kaolins. However, the benefits associated with calcined and chemically aggregated kaolins are not without disadvantages. The manufacturing costs of calcined and chemically aggregated kaolins are significantly higher than those of hydrous kaolins. The calcined and chemically aggregated kaolins also have the effect of improving certain paper properties while adversely effecting other properties, e.g., strength.

Kaolin has been used as an extender or pigment in paints, plastics and paper coating compositions. Kaolin pigments confer desirable physical and optical properties to such compositions. As flattening (or matting) agents, they help smooth the surfaces of the substrates to which they are applied. As opacifiers, they impart brightness, whiteness, gloss and other desirable optical properties. As extenders, they allow partial replacement of titanium dioxide and other more expensive pigments with minimal loss of whiteness or brightness.

Paper coatings are applied to sheet materials for a number of purposes including, but not limited to, increasing the gloss, smoothness, opacity and/or brightness of the material. Coatings may also be applied to hide surface irregularities or in other ways improve the surface for the acceptance of print. Paper coatings are generally prepared by forming a fluid aqueous suspension of pigment material together with a hydrophilic adhesive and other optional ingredients.

Coatings have been conventionally applied by means of a coating machine including a short dwell time coating head, which is a device in which a captive pond of coating composition under a slightly elevated pressure is held in contact with a moving paper web for a time sufficient to coat the paper before excess coating composition is removed by means of a trailing blade.

Additional advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 4 is a flowchart illustrating the process for making a barrier coating pigment from a coarse fraction kaolin;

SUMMARY OF THE INVENTION

Figure 1:
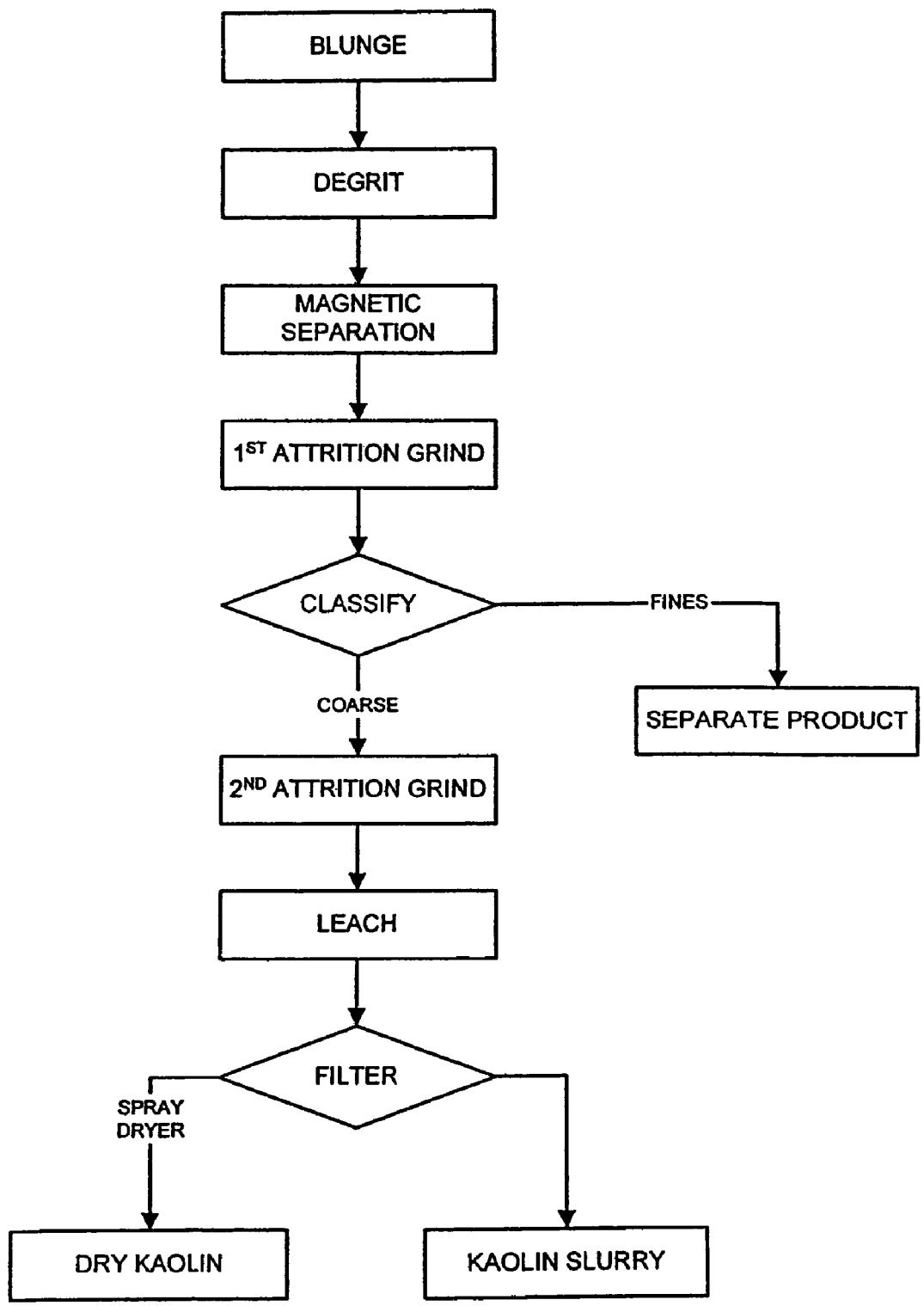
FIG. 1 is a flowchart illustrating a process for refining a coarse fraction kaolin according to Example 1.

Generally, kaolins used in coatings and fillers are selected to have a narrow particle size distribution and high crystallinity which have been believed to provide the favored set of physical and optical properties, for example, maximum light scatter. Generally, coarse kaolin clays have been recognized as exhibiting poor light scatter. The present invention differs from the prior art in providing a coating or filling composition including a kaolin that may be rather coarse, but which nonetheless exhibits high light scatter. As a filler in, for example, unbleached kraft paper, the kaolins according to the present invention showed a light scatter similar to calcined clays without the detrimental effects on strength associated with calcined clays. The compositions according to the present invention further improve over prior compositions by making it possible to maintain sheet brightness while further reducing the amount of expensive $TiO_2$ present in the paper coating composition.

There is disclosed a paper coating composition comprising at least one kaolin having a shape factor of at least about 70:1, a $TiO_2$, a binder, and optionally a dispersant, and wherein the paper coating composition has a ratio of the kaolin to $TiO_2$ of less than about 85:15 parts by weight.

There is further disclosed a method of making a coated paper comprising coating a fibrous substrate with a paper coating composition comprising a binder and at least one kaolin having a shape factor of at least about 70:1.

There is still further disclosed a method of making a filled paper comprising adding to said paper kaolin having a shape factor of at least about 70:1.

There is also disclosed a coated paper comprising a fibrous substrate and a paper coating composition comprising kaolin having a shape factor of at least about 70:1.

Finally, there is disclosed a method of improving barrier properties in paper comprising coating a fibrous substrate with a coating composition comprising kaolin having a shape factor of at least about 70:1.

One aspect of the present invention provides a composition comprising kaolin having a shape factor of at least about 70:1. In other embodiments, the kaolin can have a shape factor of at least about 80:1, at least about 90:1, or at least about 100:1.

Another aspect of the present invention provides a coating composition, comprising kaolin having a shape factor of at least about 70:1, a binder; and optionally a dispersant.

Another aspect of the present invention provides a filler comprising kaolin having a shape factor of at least about 70:1.

Another aspect of the present invention provides a method of making a coated paper comprising coating a fibrous substrate with a paper coating composition comprising a carrier and kaolin having a shape factor of at least about 70:1.

Another aspect of the present invention provides a method of making a filled paper comprising providing a fibrous substrate, and adding to the substrate kaolin having a shape factor of at least about 70:1.

Another aspect of the present invention provides a coated paper comprising a fibrous substrate and a coating on the substrate comprising kaolin having a shape factor of at least about 70:1.

Another aspect of the present invention provides a method of improving barrier properties in paper comprising coating a fibrous substrate with a coating composition comprising kaolin having a shape factor of at least about 70:1.

Another aspect of the present invention provides a method of refining kaolin, comprising providing a kaolin slurry, attrition grinding the kaolin slurry, removing the coarse particle size fraction from the slurry by centrifugation, and attrition grinding the coarse-particle size fraction to provide a kaolin product having a shape factor of at least about 70:1.

Another aspect of the present invention provides an extender for paint comprising kaolin, prepared by a method comprising providing a kaolin slurry comprising whole crude kaolin or a blend of whole crude and coarse-particle size fractions from a centrifuge, attrition grinding the kaolin slurry, removing the coarse particle size fraction from the slurry by centrifugation, and attrition grinding the coarse-particle size fraction to provide a kaolin product having a shape factor of at least about 70:1.

Another aspect of the present invention provides a slurry comprising kaolin having a shape factor of greater than 70:1 and a stabilizing agent.

DETAILED DESCRIPTION

One aspect of the present invention provides a composition that is used in the production of coated or filled substrates. Another aspect of the present invention provides the coated or filled products made according to the present invention. The compositions and products according to the present invention utilize kaolin having a high shape factor to prepare a coated or filled paper exhibiting improved brightness. "Shape factor" as used herein is a measure of an average value (on a weight average basis) of the ratio of mean particle diameter to particle thickness for a population of particles of varying size and shape as measured using the electrical conductivity method and apparatus described in U.S. Pat. No. 5,128,606, which is incorporated herein by reference in its entirety. In the measurement method described in U.S. Pat. No. 5,128,606, the electrical conductivity of a fully dispersed aqueous suspension of the particles under test is caused to flow through an elongate tube. Measurements of the electrical conductivity are taken between (a) a pair of electrodes separated from one another along the longitudinal axis of the tube, and (b) a pair of electrodes separated from one another across the transverse width of the tube, and using the difference between the two conductivity measurements the shape factor of the particulate material under test is determined. "Hyperplaty" refers to hydrous kaolin clays with shape factors of greater than about 40:1. In one embodiment according to the present invention, the kaolin clays have shape factors of greater than about 70:1, for example greater than about 80:1, or greater than about 90:1. According to another aspect of the invention, the shape factor is greater than about 100:1, for example 110:1 and above. In another embodiment, the kaolin clay has a shape factor of at and above about 120:1 and at and above about 140:1. The clays according to these embodiments of the invention have been found to show surprisingly high light scatter in paper coatings and fillings.

The high shape factor may be achieved by grinding mined kaolinitic clays until the desired shape factor is achieved. Any art recognized grinding method can be used with the present invention including but not limited to, for example, wet grinding using sand or ceramic media. According to one embodiment of the present invention, the kaolin may be prepared by light comminution, e.g., grinding or milling, of a coarse kaolin to give suitable delamination thereof. The comminution may be carried out by use of beads or granules of a ceramic or plastic, e.g., nylon, grinding or milling aid. Appropriate grinding energies will be readily apparent and easily calculated by the skilled artisan. Significant grinding energies may be necessary to attain desirable high shape factors, however kaolin crude selected for its natural platyness will grind to high shape factors in an energy range typically used to manufacture standard delaminated kaolin pigments that have lesser shape factors.

Crude kaolin or a high shape factor product obtained from grinding or milling may be refined to remove impurities and improve physical properties using well known procedures generally referred to as beneficiation processes. The kaolin may be treated by a known particle size classification procedure, screening and/or centrifuging, to obtain particles having a desired particle size distribution and $d_{50}$ value (as discussed below). According to one embodiment according to the present invention, mined clays are suitably first degritted before they are subjected to grinding to achieve the desired shape factor.

"Mean particle diameter" is defined as the diameter of a circle that has the same area as the largest face of the particle. The mean particle size, $d_{50}$ value, and other particle size properties referred to in the present application are measured in a well known manner by sedimentation of the particulate material in a fully dispersed condition in an aqueous medium using a SEDIGRAPH 5100 machine as supplied by Micromeritics Corporation. Such a machine provides measurements and a plot of the cumulative percentage by weight of particles having a size, referred to in the art as the "equivalent spherical diameter" (esd), less than the given esd values. The mean particle size $d_{50}$ is the value determined in this way of the particle esd at which there are 50% by weight of the particles, which have an esd less than that $d_{50}$ value.

The value of $d_{50}$ for the particulate kaolin according to the present invention may be, for example, in the range of about 0.2 μm to about 10 μm.

Previously, it was believed that coarse kaolin particles yielded pigment products having poor light scatter. The present invention's use of hyperplaty clay allows significantly coarser products to be used with comparable or better light scatter. According to one embodiment of the present invention, the particle size distribution of the kaolin may be such that about 20% or more of the particles have an esd of 2 microns or less. A suitable product according to the invention may have a particle size distribution where about 50% to about 85% of the particles have an esd of 2 microns or less.

The steepness of the particle size distribution (psd) of the particulate kaolin according to the present invention, often referred to as narrowness of the psd, refers to the slope of the psd curve. Thus, in some cases the psd of the kaolin according to the present invention may be steep and in other cases it may be broad. The steepness or broadness of the psd is one indicator of anticipated product performance and can be selected by the skilled artisan based upon desired end properties. Steepness, as used in herein, is measured as 100 times the ratio of $d_{30}$ to $d_{70}$, where $d_{30}$ is the value of the particle esd less than which there are 30% of the particles and $d_{70}$ is the value of the particle esd less than which there are 70% of the particles as obtained from the psd measure above.

Another aspect of the present invention provides a kaolin product having a shape factor value of at least about 70 formed by attrition grinding a coarse particle size kaolin fraction. Kaolin consists predominantly of kaolinite crystals, which are shaped as thin hexagonal plates or in booklets of platelets called "stacks." Kaolinite stacks may be subjected to a grinding action to easily separate or delaminate the stacks or books comprised of more than one platelet into smaller books or individual platelets. The act of delamination parts or cleaves natural kaolinite crystals along the (001) crystallographic plane that is perpendicular to its "c-axis." Many standard kaolin products are made by attrition grinding a dispersed slurry of blunged-degritted-brightness beneficiated blend of whole crude and coarse-particle size fraction from a centrifuge. These standard delaminated products, however, may not show sufficient delamination, as they can contain booklets that comprise several to scores of kaolinite platelets.

Accordingly, this aspect of the present invention provides a method for obtaining a kaolin having a shape factor of about 70:1 or higher. The method comprises: (a) providing a kaolin slurry, where in one embodiment, the slurry comprises a whole crude kaolin or a blend of whole crude and coarse particle kaolin from a centrifuge; (b) attrition grinding the kaolin slurry; (c) removing a coarse particle size fraction from the slurry by centrifugation; and (d) attrition grinding the coarse-particle size fraction. Optionally, a centrifugation step may be inserted prior to (b) to remove ultrafine particles in order to enhance the efficiency of attrition grinding.

In one embodiment, the kaolin product is produced by attrition grinding a crude clay slurry. The crude can comprise, in one embodiment, either a whole crude or a blend of whole crude and coarse-particle size fractions from a centrifuge. The clay slurry may be a dispersed-degritted-brightness beneficiated clay slurry.

In one embodiment, the kaolin slurry can be obtained from crude kaolin ore, which is generally a viscous, sedimentary kaolin containing micas, mixed-layered clay minerals, smectites, and vermiculites or hydrous micas. An exemplary kaolin clay crude further comprises potassium oxide in an amount ranging from 0.10% to 3.0% by weight, and magnesium oxide in an amount ranging from 0.03% to 0.5% by weight. Such crude can have a shape factor equal to or greater than 15, or equal to or greater than 25. The crude kaolin can have a particle size distribution of 75% by weight less than 2 μm.

To form the kaolin slurry, water can be added to a dry kaolin crude to form an aqueous suspension, such as a suspension containing from 30% to 70% kaolin on a dry weight basis. Chemicals can be added to disperse the clay particles. The kaolin slurry can then be degritted to remove sand-sized particles prior to further processing or transport by pipeline to a plant.

Where the crude kaolin slurry comprises a blend of whole crude and coarse-particle size fractions from a centrifuge, the coarse particle size fraction may have a shape factor of greater than 20, such as a shape factor greater than 25. In another embodiment, the coarse particle size fraction may have a shape factor of greater than 35.

The attrition grinding steps can be performed with a particulate grinding medium for a time sufficient to dissipate in the slurry or suspension enough energy to impart the kaolin particles with a shape factor value ranging from about 35 to about 60 or greater. In another embodiment, the attrition grinding the crude kaolin slurry results in kaolin having a shape factor value of at least about 60.

The amount of energy dissipated in the suspension of kaolin clay can range from about 20 kWh to about 100 kWh, such as from about 25 to about 75 kWh of energy per ton of kaolin present on a dry weight basis. The attrition grinding mill is equipped with a stirrer, which is capable of being rotated at a speed such that a vortex is formed in the suspension in the mill during grinding.

The particulate grinding medium can have a specific gravity of 2 or more. In one embodiment, the grinding medium comprises grains of quartz sand, or similar media. The grains can have a diameter of less than 2 mm. In another embodiment, the grains have a diameter of greater than 0.25 mm and less than 2 mm. In yet another embodiment, the grinding medium comprises fine (20–40#) Carbolite media.

Prior to attrition grinding the crude kaolin slurry, the slurry can be subjected to beneficiation and/or degritting processes. In one embodiment, the crude kaolin slurry comprises a dispersed-degritted-brightness beneficiated clay slurry. Degritting is the process of passing a kaolin clay slurry through drag boxes and a screen to remove coarse (grit) particles of a given size. For example, the screen can be a +325 mesh (U.S. Standard) screen suitable for removing particles larger than 45 μm.

After attrition grinding the crude slurry, the slurry can be passed through a centrifuge, such as a solid-bowl decanter centrifuge, for a classification step, where the clay is classified to a particle size distribution such that 80% to 95% by weight of the particles have an esd less than 2 μm. In one embodiment, 85% to 92% by weight of the particles have an esd less than 2 μm. In yet another embodiment, 20% to 40% of the particles have an esd less than 0.25 μm. In still another embodiment, 25% to 35% of the particles have an esd less than 0.25 μm. In still another embodiment, the weight of the particles in the finer fraction ranges from 5% to 30% of the feed to centrifuge.

After removing the coarse-particle size fraction of the attrition-ground product, i.e. the "b-fraction" via a centrifuge, the coarse-fraction can be diluted with water to form a slurry that may be subjected to an additional attrition grinding step to produce the final kaolin product having a shape factor value of at least 70. This product may alternatively subject to further beneficiation to obtain desired brightness or rheology through conventional processing techniques such as flotation, selective flocculation, and bleaching. Previously, in some instances, coarse fractions were discarded, as this kaolin fraction was sometimes regarded as being too coarse for coating applications. Thus, one advantage of this embodiment arises from the use of coarse fraction, which was in some cases a previously undesired manufacturing by-product, to produce a useful, kaolin product.

In one embodiment, the coarse particle size fraction comprises kaolin having a shape factor of at least about 20, such as at least about 25 or at least about 30, and in some cases as high as about 50 to about 60.

The final kaolin particles can have a mean particle size ($d_{50}$ by Sedigraph) ranging from about 0.1 μm to about 2.0 μm, such as a $d_{50}$ ranging from about 0.25 μm to about 1 μm.

In another embodiment the coarse particle fraction kaolin slurry is subjected to a beneficiation step and/or a degritting step, prior to the attrition grinding process. In another embodiment, the coarse particle fraction kaolin slurry is subjected to both beneficiation and degritting processes.

In one embodiment, the invention can advantageously reduce the population of kaolin crystals that exist as stacks. The kaolin product of the invention can have superior coverage relative to standard kaolin in lightweight and ultra lightweight coated paper applications, as the higher population of individual plate crystals present in hyperplaty kaolin provides a relatively thin and uniform plate thickness. In one embodiment, the invention provides a paper coated with hyperplaty kaolin, as described herein.

Another aspect of the present invention provides an extender for paints, the extender comprising a coarse particle size kaolin having a $d_{50}$ ranging from about 0.25 μm to about 2.0 μm. In one embodiment, the kaolin extender has a shape factor of greater than about 90. The extender can be prepared by attrition grinding a coarse particle size kaolin fraction, as described above.

In certain applications, it may be desired to use extenders with a balance of low sheen and high opacity. Accordingly, in one embodiment, the extender is coarse, with a $d_{50}$ ranging from 0.25 μm to 2.0 μm, such as a $d_{50}$ ranging from 0.5 μm to 1.5 μm. For example, the $d_{50}$ can be approximately 1.3 μm. In other applications, control of sheen may not be required, and therefore the kaolin can comprise finer particles with a $d_{50}$ ranging from 0.25 μm to 1 μm. For example, the $d_{50}$ can be approximately 0.6 μm.

Another embodiment provides a paint comprising an extender comprising a coarse particle size kaolin having a $d_{50}$ ranging from 0.25 μm to 2.0 μm. In one embodiment, the kaolin extender has a shape factor of at least 70:1, or any other value described herein. In another embodiment, the kaolin extender has a shape factor of at least 100:1.

Another aspect of the present invention provides an extender for paint comprising a kaolin, prepared by a method comprising providing a kaolin slurry comprising whole crude kaolin or a blend of whole crude and coarse-particle size fractions from a centrifuge, attrition grinding the kaolin slurry, removing the coarse particle size fraction from the slurry by centrifugation, and attrition grinding the coarse-particle size fraction to provide a kaolin product having a shape factor of at least about 70:1, or any of the shape factors described herein.

Another aspect of the present invention relates to the use of the hyperplaty clay for filling, for example, paper or paperboard product, such as a supercalendered magazine paper filler product. In one embodiment, the paper or paperboard product is filled with a kaolin having a shape factor value of at least about 70.

Another aspect of the invention provides a method of making a matte paper coating, comprising: (a) attrition grinding a crude kaolin slurry comprising a blend of coarse-fractions from a centrifuge that have been degritted to 80% finer than 5 μm; (b) removing the coarse particle size fraction from the slurry by centrifugation; and (c) attrition grinding the coarse particle size fraction to provide kaolin having a shape factor of at least 70:1.

Another aspect of the invention provides a method for producing a pigment product comprising:

(a) mixing a raw or partially processed kaolin clay with water to form an aqueous suspension;

(b) attrition grinding the suspension produced by step (a) by using a particulate grinding medium by a process in which the average shape factor of the kaolin clay is increased by at least 10, preferably at least 20;

(c) separating the suspension of ground kaolin clay from the particulate grinding medium; and (d) dewatering the suspension of ground kaolin clay separated in step (c) to recover a kaolin pigment therefrom.

In step (a) of the method according to the second aspect of the present invention, the kaolin clay may form from 20% to 70%, usually from 20% to 45% of the treated suspension. The kaolin clay can comprise a sedimentary kaolin clay, such as a sedimentary kaolin clay from Georgia, USA. The raw kaolin clay may have a psd such that not more than about 40% by weight comprises particles having an esd larger than 10 μm and not more than 50% by weight, e.g. from about 20% to about 40% by weight, comprising particles having an esd smaller than 2 μm. The shape factor of the kaolin clay treated in step (a) may be less than 15, such as in the range of from about 5 to about 10. Thus, the shape factor may be increased by a differential of at least 30, in some cases at least 40, e.g. from a shape factor value of less than 15 to a shape factor value greater than 55.

When preparing an aqueous suspension of the kaolin clay to be treated in step (a) a dispersing agent for the kaolin clay may or may not be added to the kaolin clay.

The kaolin clay employed in step (a) may be a coarse component obtained from classifying, e.g. using a centrifuge, a standard blocky sedimentary kaolin clay, such as a kaolin clay having a shape factor of from 5 to 10. The coarse component may have not more than 50% by weight of particles having an esd less than 2 µm and not more than 10% by weight having an esd less than 0.25 µm.

The psd of the kaolin clay may be adjusted by blending from 99 to 50 parts by weight of the kaolin clay with from 1 to 50 parts by weight, such as from 10 to 30 parts by weight, of a fine platy kaolin component, e.g. having a shape factor of at least 15, such as from 15 to 40 and whose percentages by weight of particles smaller than 2 µm and 0.25 µm are respectively at least 85% by weight and at least 20% by weight. The fine platy kaolin component may be a kaolin derived from either a primary or a sedimentary deposit. The fine platy kaolin component may be added to the kaolin or obtained from the coarse component prior to or after the grinding step (b). The addition may be carried out with the kaolins to be blended in either powdered, dry form or in the form of an aqueous suspension.

A resulting kaolin product prepared by blending in the manner described can improve characteristics of the kaolin, such as the rheology and dewatering characteristics of a resulting aqueous suspension, and can provide better runnability and particle alignment when the kaolin is used in a coating composition.

The kaolin clay may be subjected to one or more well known purification steps to remove undesirable impurities, e.g. between steps (a) and (b) or between steps (c) and (d). For example, the aqueous suspension of kaolin clay may be subjected to a froth flotation treatment operation to remove titanium containing impurities in the froth. Alternatively, or in addition, the suspension may be passed through a high intensity magnetic separator to remove iron containing impurities.

Step (b) may comprise a process wherein the suspension of kaolin clay is treated by medium attrition grinding wherein an energy of from about 40 kWh to about 250 kWh per tonne of clay (on a dry weight basis) is dissipated in the suspension.

The process of step (b) may comprise a process comprising at least two stages, namely a first-stage (b1) wherein delamination of the kaolin clay occurs and a second stage (b2) wherein comminution of the platelets of the kaolin clay occurs.

A gentle comminution step (b1) can be performed, such as grinding via a particulate grinding medium in order to break down composite particles, which are present in the raw kaolin clay. Such composite particles generally comprise coherent stacks or blocks of individual hexagonal plate-like particles, especially where the kaolin clay is from a sedimentary deposit. When the kaolin clay is subjected to relatively gentle comminution, e.g. by grinding in step (b1), many of the composite particles can be broken down to give the individual thin, substantially hexagonal plates, i.e., delamination, the result being an increase of the average shape factor of the kaolin clay. For example, this process may increase the shape factor of the kaolin clay from a starting shape factor of about 5 to 10 to an increased shape factor of at least about 50 to 55. By "relatively gentle grinding" we mean grinding in an attrition grinding mill with a particulate grinding medium, the contents of the attrition grinding mill being agitated by means of an impeller which rotates at a speed which is insufficient to set up a vortex in the suspension, such as at a peripheral speed below about 10 m.s$^{-1}$ and in which the amount of energy dissipated in the suspension during grinding is less than about 75 kWh, such as less than about 55 kWh per ton of kaolin clay on a dry weight basis. The particulate grinding medium can be of relatively high specific gravity, for example 2 or more, and may for example may comprise grains of silica sand, the grains generally having diameters not larger than about 2 mm and not smaller than about 0.25 mm.

The second stage (b2) of the two stage form of step (b) can comprise grinding in an attrition grinding mill which is equipped with a stirrer capable of being rotated at a speed such that a vortex is formed in the suspension in the mill during grinding. The particulate grinding medium can have a specific gravity of 2 or more, and can comprise, for example, grains of silica sand where the grains can have diameters not larger than about 2 mm and not smaller than about 0.25 mm. If stage (b2) is preceded by a relatively gentle comminution in stage (b1), the amount of energy dissipated in the suspension of kaolin clay in stage (b2) can be in the range of from about 40 kWh to about 120 kWh per dry ton of kaolin clay. If the relatively gentle comminution step (b1) is omitted, the amount of energy dissipated in the suspension of kaolin clay in step (b) can be in the range of from about 100 kWh to about 250 kWh per dry ton of kaolin clay.

In step (c), the suspension of ground kaolin clay can be separated from the particulate grinding medium in any manner known in the art, such by passing the suspension through a sieve of appropriate aperture size, for example a sieve having nominal aperture sizes in the range of from about 0.1 mm to about 0.25 mm.

Following step (c) or step (d) the kaolin clay may be further treated to improve one or more of its properties. For example high energy liquid working, such as by using a high speed mixer, may be applied to the product in slurry form, e.g. before step (d) or after step (d) and subsequent re-dispersion in an aqueous medium, e.g. during makedown of a coating composition.

In step (d), the suspension of ground kaolin may be dewatered in one of the ways well known in the art, e.g. filtration, centrifugation, evaporation and the like. In one embodiment, dewatering can be performed via a filter press. For example, use of a filter press may be made to form a cake having a water content in the range of from about 15% to about 35% by weight. This cake may be mixed with a dispersing agent for the kaolin clay and can be converted into a fluid slurry, which may be transported and sold in this form. Alternatively, the kaolin clay may be thermally dried, for example by introducing the fluid slurry of the kaolin clay into a spray drier and transported in a substantially dry form.

A fine platy kaolin component may be blended with the product of step (d) in the manner described earlier if such a component has not already been added prior to step (d).

In one embodiment, the pigment product may have a specific surface area as measured by the BET, N$_2$ method of at least 12 m$^2$.g$^{-1}$, preferably from 15 m$^2$.g$^{-1}$ to 20 m$^2$.g$^{-1}$.

In one embodiment, pigment product produced in this aspect of the invention may be used in paper coating. The coating composition can be used for producing gloss coatings on paper and other substrates which composition comprises an aqueous suspension of a particulate pigment together with a hydrophilic adhesive or binder.

The solids content of the paper coating composition may be greater than 60% by weight, such as a solids content of at least 70%, or even as high as possible but still giving a suitably fluid composition which may be used in coating. The composition may include a dispersing agent, e.g. up to 2% by weight of a polyelectrolyte based on the dry weight of pigment present, or any other dispersing agent known in the art, such as those described herein. The pigment product according to the first aspect of the invention may be used as the sole pigment in a paper coating composition, or it may be used in conjunction with one or more other known pigments, such as for example, (commercially available) kaolin, calcined kaolin, natural or precipitated calcium carbonate, titanium dioxide, calcium sulphate, satin white, talc and so called 'plastic pigment'. In one embodiment, when a mixture of pigments is used, the pigment product according to this aspect of the invention, is present in the mixture in an amount of at least 80% of the total dry weight of the mixed pigments.

The binder of the composition may comprise an adhesive derived from natural starch obtained from a known plant source as described herein, although it is not essential to use starch as a binder ingredient. Other binders, which may be used with or without starch are also described herein.

Where starch is employed as a binder ingredient, the starch may be unmodified or raw starch, or it may be modified by one or more chemical treatments known in the art. The starch may, for example, be oxidized to convert some of its —$CH_2OH$ groups to —COOH groups. In some cases the starch may have a small proportion of acetyl, —$COCH_3$, groups. Alternatively, the starch may be chemically treated to render it cationic or amphoteric, i.e., with both cationic and anionic charges. The starch may also be converted to a starch ether, or hydroxyalkylated starch by replacing some —OH groups with, for example, —$OCH_2CH_2OH$ groups, —$OCH_2CH_3$ groups or —$OCH_2CH_2CH_2OH$ groups. A further class of chemically treated starches that may be used is that known as the starch phosphates. Alternatively, the raw starch may be hydrolyzed by means of a dilute acid or an enzyme to produce a gum of the dextrin type.

The starch binder used in the composition according to this aspect of the invention can be present in an amount ranging from 4% to 25% by weight, based on the dry weight of pigment. The starch binder may be used in conjunction with one or more other binders, for example synthetic binders of the latex or polyvinyl acetate or polyvinyl alcohol type. When the starch binder is used in conjunction with another binder, e.g. a synthetic binder, the amount of the starch binder can be present in an amount ranging from 2% to 20% by weight, and the amount of the synthetic binder can be present in an amount ranging from 2% to 12% by weight, both based on the weight of dry pigment. In one embodiment, at least 50% by weight of the binder mixture comprises modified or unmodified starch.

Another aspect of the present invention provides a method of forming a coated paper, comprising applying the kaolin composition to coat a sheet of paper and calendering the paper to form a gloss coating thereon. In one embodiment, the gloss coating is formed on both sides of the paper.

Another aspect of the present invention provides a method of making a coated paper comprising, coating a fibrous substrate with a paper coating composition comprising a filler comprising kaolin having a shape factor of at least about 70:1, or any of the shape factors described herein.

Another aspect of the present invention provides a coated paper comprising a fibrous substrate and a coating on the substrate comprising kaolin having a shape factor of at least about 70:1, or any of the shape factors described herein.

Another aspect of the present invention provides a method of making a filled paper comprising providing a fibrous substrate and adding to the substrate kaolin having a shape factor of at least about 70:1, or any of the shape factors described herein.

Calendering is a well known process in which paper smoothness and gloss is improved and bulk is reduced by passing a coated paper sheet between calender nips or rollers one or more times. Usually, elastomer coated rolls are employed to give pressing of high solids compositions. An elevated temperature may be applied. Five or more passes through the nips may be applied.

The paper after coating and calendering in the method according to this aspect may have a total weight per unit area ranging from 30 $g.m^{-2}$ to 70 $g.m^{-2}$, such as from 49 $g.m^{-2}$ to 65 $g.m^{-2}$, or further from 35 $g.m^{-2}$ to 48 $g.m^{-2}$. The final coating can have a weight per unit area ranging from 3 $g.m^{-2}$ to 20 $g.m^{-2}$, such as from 5 $g.m^{-2}$ to 13 $g.m^{-2}$. Such a coating may be applied to both sides of the paper. The coated paper may be LWC or ULWC paper. The paper gloss may be greater than 45 TAPPI units and the Parker Print Surf value at a pressure of 1 MPa of each paper coating may be less than 1 μm.

The gloss of a coated paper surface may be measured by means of a test laid down in TAPPI Standard No 480 ts-65. The intensity of light reflected at an angle from the surface of the paper is measured and compared with a standard of known gloss value. The beams of incident and reflected light are both at an angle of 75° to the normal to the paper surface. The results are expressed in TAPPI gloss units. In one embodiment, the gloss of the pigment product may be greater than 50, in some cases greater than 55, TAPPI units.

The Parker Print Surf test provides a measure of the smoothness of a paper surface, and comprises measuring the rate at which air under pressure leaks from a sample of the coated paper which is clamped, under a known standard force, between an upper plate which incorporates an outlet for the compressed air and a lower plate, the upper surface of which is covered with a sheet of either a soft or a hard reference supporting material according to the nature of the paper under test. From the rate of escape of the air, a root mean cube gap in am between the paper surface and the reference material is calculated. A smaller value of this gap represents a higher degree of smoothness of the surface of the paper under test.

An improvement can be provided where the binder present in the coating composition comprises starch. However, an improvement is also obtained where other known starch-free binders are employed (with or without starch present). In each case the adhesive or binder may form from 4% to 30%, e.g., 8% to 20%, for example from 8% to 15% by weight of the solids content of the composition. The amount employed will depend upon the composition and the type of adhesive, which may itself incorporate one or more ingredients.

The particulate kaolin according to the present invention may be mixed with other pigments, fillers and extenders to obtain a blend of properties provided by the constituents of the mixture. The added pigment, filler or extender material may comprise one or more of hydrous kaolin, calcined kaolin, aggregated kaolin, calcium carbonate (ground or precipitated) talc, gypsum or other known white particulate mineral or pigment material.

Paper coatings and paper fillers according to the present invention include, in addition to the kaolin as described above, materials generally used in the production of paper coatings and paper fillers. Specifically, the compositions will include a binder and a pigment, typically $TiO_2$. The fillers and coatings according to the present invention may optionally include other additives, including, but not limited to, dispersants, cross linkers, water retention aids, viscosity modifiers or thickeners, lubricity or calendering aids, anti-foamers/defoamers, gloss-ink hold-out additives, dry or wet rub improvement or abrasion resistance additives, dry or wet pick improvement additives, optical brightening agents or fluorescent whitening agents, dyes, biocides, leveling or evening aids, grease or oil resistance additives, water resistance additives and/or insolubilisers.

Any art recognized binder may be used in the present invention. Exemplary binders include, but are not limited to, adhesives derived from natural starch obtained from a known plant source, for example, wheat, maize, potato or tapioca; synthetic binders, including styrene butadiene, acrylic latex, vinyl acetate latex, or styrene acrylic; casein; polyvinyl alcohol; polyvinyl acetate; or mixtures thereof.

Paper coatings have very different binder levels depending upon the type of printing to be used with the coated paper product. Appropriate binder levels based upon the desired end product would be readily apparent to the skilled artisan. Binder levels are controlled to allow the surfaces to receive ink without disruption. The latex binder levels for paper coatings generally range from about 3% to about 30%. In one embodiment according to the present invention, the binder is present in the paper coating in an amount of from about 3% to about 10%. In another embodiment according to the present invention, the binder is present in the coating in an amount ranging from about 10% to about 30% by weight.

Another aspect of the present invention provides a method of making a barrier coating from a coarse fraction kaolin having the properties described herein. Barrier coatings are useful to impart to paper resistance to moisture, moisture vapor, grease, oil, air, etc.

When making barrier coatings, the amount of binder in the formulation may be very high on the order of 40% to 50%. The binder combined with the flattest possible plates result in a coating, which exhibits excellent barrier properties.

Another aspect of the present invention provides a barrier coating composition, comprising a slurry comprising kaolin having a shape factor of at least about 70:1, or any of the shape factors described herein. The solids content of the slurry can range from about 45% to about 70%.

Another aspect of the present invention provides a method of improving barrier properties in a paper comprising coating a fibrous substrate with a paper coating composition comprising a kaolin having a shape factor of at least about 70:1, or any of the shape factors described herein.

Another aspect of the present invention provides a filler comprising a kaolin having a shape factor of at least about 70:1, or any of the shape factors described herein.

Another aspect of the present invention provides a slurry comprising a kaolin having a shape factor of greater than 70:1 and a stabilizing agent. In one embodiment, the kaolin can have a shape factor of at least about 80:1, or any of the shape factors described herein.

Many stabilizing agents are known in the art for such slurries. In one embodiment, the stabilizing agent comprises carboxymethylcellulose. In another embodiment, the stabilizing agent can comprise a smectite clay. In yet another embodiment, the stabilizing agent can comprise bentonite. In still another embodiment, the stabilizing agent can comprise hectorite.

In one embodiment, the stabilizing agent is present in the slurry in an amount ranging from about 4 pounds per dry tonne kaolin to about 10 lbs per dry tonne kaolin.

In one embodiment, the slurry has a solids content of greater than about 45%, such as a solids content ranging from about 50% to about 60%.

Dispersants may be chosen from any art recognized dispersants for use in paper coating or paper filling compositions. Appropriate dispersants will be readily apparent to the skilled artisan. Dispersant may be chosen from poly-electrolytes such as polyacrylates and copolymers containing polyacrylate species, especially polyacrylate salts (such as sodium and aluminum optionally with a group II metal salt), sodium hexametaphosphates, non-ionic polyol, polyphosphoric acid, condensed sodium phosphate, non-ionic surfactants, alkanolamine and other reagents commonly used for this function.

The kaolin according to the present invention may be used as the sole pigment in the paper coatings and paper fillers of the present invention. Alternatively, the hyperplaty kaolin described above may be combined with another pigment. Additional pigments for use in the composition according to the present invention can be selected from any art recognized pigment. Pigments may be selected from other kaolin, calcined kaolin, natural or precipitated calcium carbonate, titanium dioxide, calcium sulphate, satin white, talc or other plastic pigments. According to one embodiment of the present invention, a pigment can be $TiO_2$. In exemplary compositions according to the present invention, $TiO_2$ is present in an amount ranging from 0 to 30 parts, such as from 5–20 parts or from 10–20 parts.

If cross linkers are used in the coating or filling composition for use with the present invention, crosslinkers are generally present in levels of up to 5% by weight. Any art recognized crosslinker may be used. Appropriate crosslinkers include, but are not limited to, glyoxals, melamine formaldehyde resins, ammonium zirconium carbonates and mixtures thereof.

If a water retention aid is used in the coating or filling composition for use with the present invention, water retention aids are generally present up to 2% by weight. Any art recognized water retention aid may be used. Appropriate water retention aids include, but are not limited to, sodium carboxymethyl cellulose, hydroxyethyl cellulose, PVA (polyvinyl acetate), starches, proteins, polyacrylates, gums, alginates, polyacrylamide bentonite and other commercially available products sold for such applications.

If a viscosity modifier or thickener is used in the coating or filling composition of the present invention, it is generally present in levels up to 2% by weight. Any art recognized thickener or viscosity modifier may be used. Appropriate viscosity modifiers or thickeners include, but are not limited to, polyacrylates, emulsion copolymers, dicyanamide, triols, polyoxyethylene ether, urea, sulphated castor oil, polyvinyl pyrrolidone, montmorillonite, CMC (carboxymethyl celluloses), sodium alginate, xanthan gum, sodium silicate, acrylic acid copolymers, HMC (hydroxymethyl celluloses), HEC (hydroxyethyl celluloses) and mixtures thereof.

If a lubricity/calender aid is used in the coating or filling composition of the present invention, it is generally present in levels up to 2% by weight. Any art recognized lubricity or calendering aid may be used. Appropriate lubricity or calendering aids include, but are not limited to, calcium stearate, ammonium stearate, zinc stearate, wax emulsions, waxes, alkyl ketene dimer, glycols and mixtures thereof.

If an antifoamer or defoamer is used in the coating or filling composition of the present invention, it is generally present in levels up to 1% by weight. Any art recognized antifoamer or defoamer may be used. Appropriate antifoamer and defoamers include, but are not limited to, blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function.

If dry or wet pick improvement additives are used in the coating or filling composition of the present invention, they are generally present in levels up to 2% by weight. Any art recognized dry or wet pick improvement additives may be used. Appropriate dry or wet pick improvement additives include, but are not limited to, melamine resin, polyethylene emulsions, urea formaldehyde, melamine formaldehyde, polyamide, calcium stearate, styrene maleic anhydride and mixtures thereof.

If dry or wet rub improvement and abrasion resistance additives are used in the coating or filling composition of the present invention, they are generally present in levels up to 2% by weight. Any art recognized dry or wet rub improvement and abrasion resistance additives may be used. Appropriate dry or wet rub improvement and abrasion resistance additives include, but are not limited to, glyoxal based resins, oxidized polyethylenes, melamine resins, urea formaldehyde, melamine formaldehyde, polyethylene wax, calcium stearate and mixtures thereof.

If a gloss-ink hold-out additive is used in the coating or filling composition of the present invention, it is generally present in levels up to 2% by weight. Any art recognized gloss-ink hold out additive may be used. Appropriate gloss-ink hold out additives include, but are not limited to, oxidized polyethylenes, polyethylene emulsions, waxes, casein, guar gum, CMC, HMC, calcium stearate, ammonium stearate, sodium alginate and mixtures thereof.

If optical brightening agents (OBA) and fluorescent whitening agents (FWA) are used in the coating or filling composition of the present invention, they are generally present in levels up to 1% by weight. Any art recognized optical brightening agents (OBA) and fluorescent whitening agents (FWA) may be used. Appropriate optical brightening agents (OBA) and fluorescent whitening agents (FWA) include, but are not limited to, stilbene derivatives.

If a dye is used in the coating or filling composition of the present invention, it is generally present in levels up to 0.5% by weight. Any art recognized dye may be used.

If a biocide/spoilage control agent is used in the coating or filling composition of the present invention, it is generally present in levels up to 1% by weight. Any art recognized biocide/spoilage agent may be used. Appropriate biocides/spoilage agents include, but are not limited to, metaborate, sodium dodecylbenene sulphonate, thiocyanate, organosulphur, sodium benzonate and other compounds sold commercially for this function such as the range of biocide polymers sold by Calgon Corporation.

If a leveling aid is used in the coating or filling composition of the present invention, it is generally present in levels up to 2% by weight. Any art recognized leveling aid may be used. Appropriate leveling aids include, but are not limited to, non-ionic polyol, polyethylene emulsions, fatty acid, esters and alcohol derivatives, calcium stearate and other compounds sold commercially for this function.

If a grease and oil resistance additive is used in the coating or filling composition of the present invention, it is generally present in levels up to 2% by weight. Any art recognized grease and oil resistance additive may be used. Appropriate grease and oil resistance additives include, but are not limited to, oxidized polyethylenes, latex, SMA (styrene maleic anhydride), polyamide, waxes, alginate, protein, CMC, HMC and mixtures thereof.

If a water resistance additive is used in the coating or filling composition of the present invention, it is generally present in levels up to 2% by weight. Any art recognized water resistance additive may be used. Appropriate water resistance additives include, but are not limited to, oxidized polyethylenes, ketone resin anionic latex, polyurethane, SMA, glyoxal, melamine resin, urea formaldehyde, melamine formaldehyde, polyamide, glyoxals, stearates and other materials commercially available for this function.

If an insolubilizer is used in the coating or filling composition of the present invention, it is generally present in levels up to 2% by weight. Any art recognized insolubilizer may be used.

The substrate to be filled or coated may be selected from any art recognized fibrous substrate. Substrates for use in the present invention include both wood based and woodfree substrates. Exemplary substrates according to the present invention are paper.

The present invention can be used in the production of all paper grades, from ultra lightweight coated paper to coated or filled board.

Lightweight coated, or LWC, paper is generally coated to a weight of from about 5 $g.m^{-2}$ to about 13 $g.m^{-2}$ on each side, and the total weight per unit area of the coated paper is generally in the range of from about 49 $g.m^{-2}$ to about 65 $g.m^{-2}$.

LWC paper is generally used for printing magazines, catalogues and promotional material. The coated paper is required to meet certain standards of surface gloss and smoothness. For example, the paper is generally required to have a gloss value of at least about 32, and up to about 60, TAPPI units, and a Parker Print Surf value in the range of from about 0.5 to about 1.6 μm.

Ultra lightweight coated, or ULWC, paper is sometimes otherwise known as light lightweight coated, or LLWC, paper and is used for catalogues and for advertising and promotional material sent through the mail to reduce mailing costs. The coating weight is generally in the range of from about 2 $g.m^{-2}$ to about 7 $g.m^{-2}$ on each side, and the total weight per unit area of the coated paper is generally in the range of from about 25 $g.m^{-2}$ to about 48 $g.m^{-2}$.

Methods of coating paper and other sheet materials are widely published and well known. See, for example, Pulp and Paper International, May 1994, page 18, et. seq. Sheets may be coated on the sheet forming machine, i.e., "on-machine" or they may be coated on a coating machine, i.e., "off-machine." Any art recognized coating method may be used to produce the coated sheet according to the present invention. According to one embodiment, the coating is applied to the sheet material by an applicator, and a metering device assures that the proper level of coating composition is applied. When an excess of coating composition is applied by the applicator, the metering device is downstream of the applicator. Alternatively, the correct amount of coating composition may be applied to the applicator by the metering device, such as a film press. While coating the sheet, the sheet may be supported by backing rolls or may be subjected only to tension.

Examples of known coaters which may be used with the present invention, include, but are not limited to, air knife coaters, blade coaters, rod coaters, bar coaters, multi-head coaters, roll coaters, roll/blade coaters, case coaters, liquid application systems, reverse roll coaters, extrusion coaters, and curtain coaters.

The present invention may be used in the production of coated paper for printing. Any art recognized method of printing may be used with the coated paper according to the present invention. Appropriate printing techniques will be readily apparent to the skilled artisan. Printing techniques for use according to the present invention include, but are not limited to, rotogravure, offset printing, or flexo printing. Rotogravure involves the use of an engraved or etched cylinder as an image carrier. Image areas are etched or engraved below non-image areas in the form of tiny sunken cells. The cylinder is immersed in ink, and the excess ink is scraped off by a blade. When the substrate contacts the printing cylinder, ink transfers, forming the image. Offset printing is an indirect printing method in which the inked image on a press plate is first transferred to a rubber blanket that, in turn, "offsets" the inked impression to a press sheet.

The invention will be further clarified by the following examples, which are intended to be purely exemplary of the invention.

EXAMPLES

Example 1

This example illustrates a method of refining kaolin to produce a high shape factor kaolin, i.e., greater than or equal to 70, either as a dry kaolin or a kaolin slurry that is stabilized by adding additional water and carboxymethyl cellulose (a thickener). A "stabilized slurry" refers to a slurry where the kaolin does not appreciably settle out of solution over time. It would be expected that adding additional water would have provided a less stabilized slurry. By including a CMC (carboxymethylcellulose) thickener, a stabilized slurry is formed while decreasing the slurry solids. The stabilization process is performed as follows:

1. The product is reblunged with a small amount of dispersant, such as 35/65 Mill Chem, which is a mixture of soda ash and polyacrylate.
2. Add approximately 8 lbs/ton CMC to thicken and stabilize.
3. Add biocide to prevent bacterial interaction with the CMC.

FIG. 1 is a flowchart outlining the process of providing a high shape factor kaolin. A Georgia coarse crude kaolin is blunged, degritted, and subjected to magnetic separation. After a first attrition grinding step with sand, the product is classified to separate the coarse fraction from the fines. The coarse fraction is subjected to a second attrition grinding step, followed by leaching and filtering. A dry kaolin can be prepared by drying in a spray dryer, whereas a kaolin slurry can be prepared, such as a slurry further comprising CMC, biocide and a dispersant.

| PROCESS PRODUCT | | COARSE FRACTION FROM 1ST ATTRITION GRINDING | COARSE FRACTION FROM 2ND ATTRITION GRINDING | AFTER LEACHING** | AFTER SPRAY DRY |
|---|---|---|---|---|---|
| % solids | | 33.6% | 33.1% | 51.6% | 1.0% |
| s.g. | | 1.262 | | | |
| Tons | | 8.9 | 4.56 | | |
| pH | | | | | 7.3 |
| Brightness | | | | | 86 |
| L | | | | | 94.27 |
| a | | | | | −0.2 |
| b | | | | | 2.6 |
| $TiO_2$ | | | | | 0.612 |
| $Fe_2O_3$ | | | | | 0.44 |
| Brookfield* | | | | | 180 |
| Hercules* | | | | | 450 |
| Panacea | | 74.7 | 99.8 | 99.9 | 93 |
| PSD | <2 m | 39.3 | 56.9 | 56.5 | 56.0 |
| | <1 m | 23.1 | | 36.1 | 36.6 |
| | <.5 m | 12.9 | | 20.5 | 20.0 |
| | <.25 m | 6.8 | | 10.0 | 11.0 |
| Recovery | | 100.0% | 99.0% | 98.0% | 99.0% |

*(60% solids)
**2 lbs/ton sodium hydrosulfite

Example 2

Figure 2:
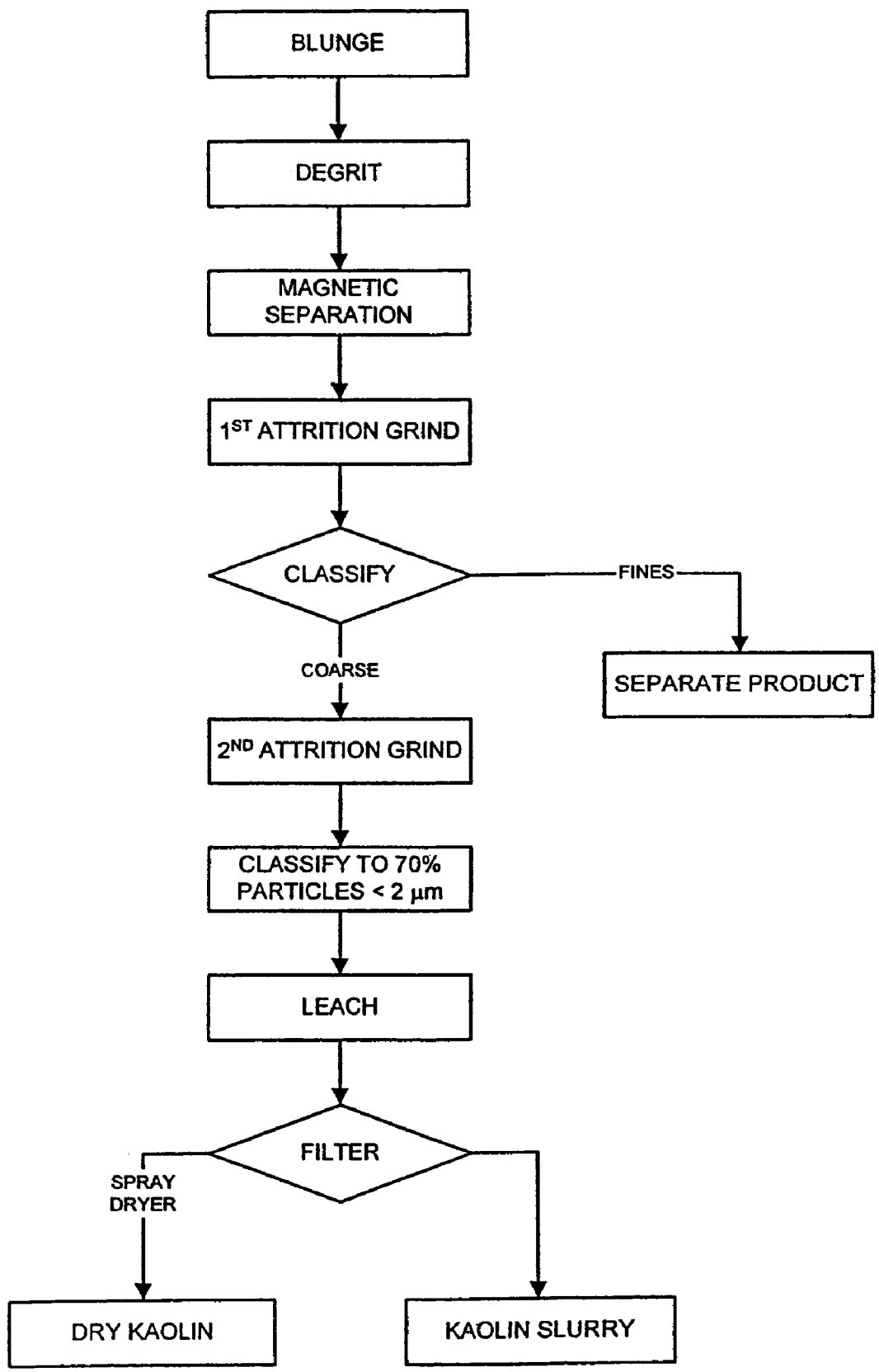
FIG. 2 is a flowchart illustrating a process for refining a coarse fraction kaolin according to Example 2.

FIG. 2 is a flowchart outlining a process for the preparation of a high shape factor kaolin. A Georgia crude kaolin is subjected to blunging and degritting steps, followed by magnetic separation and a first attrition grinding step. The product is then classified where the coarse fraction is subjected to a second attrition grinding step, followed by another classification to obtain a product where 70% of the particles have an esd less than 2 μm. This product is then leached and filtered, followed by the formation of either a dry kaolin product or a slurry.

| PROCESS PRODUCT | | COARSE FRACTION FROM 1ST ATTRITION GRINDING | COARSE FRACTION FROM 2ND ATTRITION GRINDING & CLASSIFYING | AFTER LEACHING** | AFTER SPRAY DRY |
|---|---|---|---|---|---|
| % solids | | 33.6% | 25.5% | 52.1% | 1.2% |
| s.g. | | 1.262 | 1.184 | | |
| Tons | | 8.9 | 3.58 | | |
| Brightness | | | | 87.2 | 87.44 |
| L | | | | | 95.17 |
| a | | | | | −0.18 |
| b | | | | | 2.77 |
| $TiO_2$ | | | | | 0.613 |
| $Fe2O_3$ | | | | | 0.419 |
| Brookfield* | | | | | 160 |
| Hercules* | | | | | 480 |
| Panacea | | 74.7 | | 97.4 | 87.4 |
| PSD | <2 m | 39.3 | 69.7 | | 69.1 |
| | <1 m | 23.1 | | | 48.0 |
| | <.5 m | 12.9 | | | 28.4 |
| | <.25 m | 6.8 | | | 15.0 |
| Recovery | | 100.0% | 57.3% | 98.0% | 99.0% |

*(60% solids)
**2 lbs/ton sodium hydrosulfite

Example 3

Figure 3:
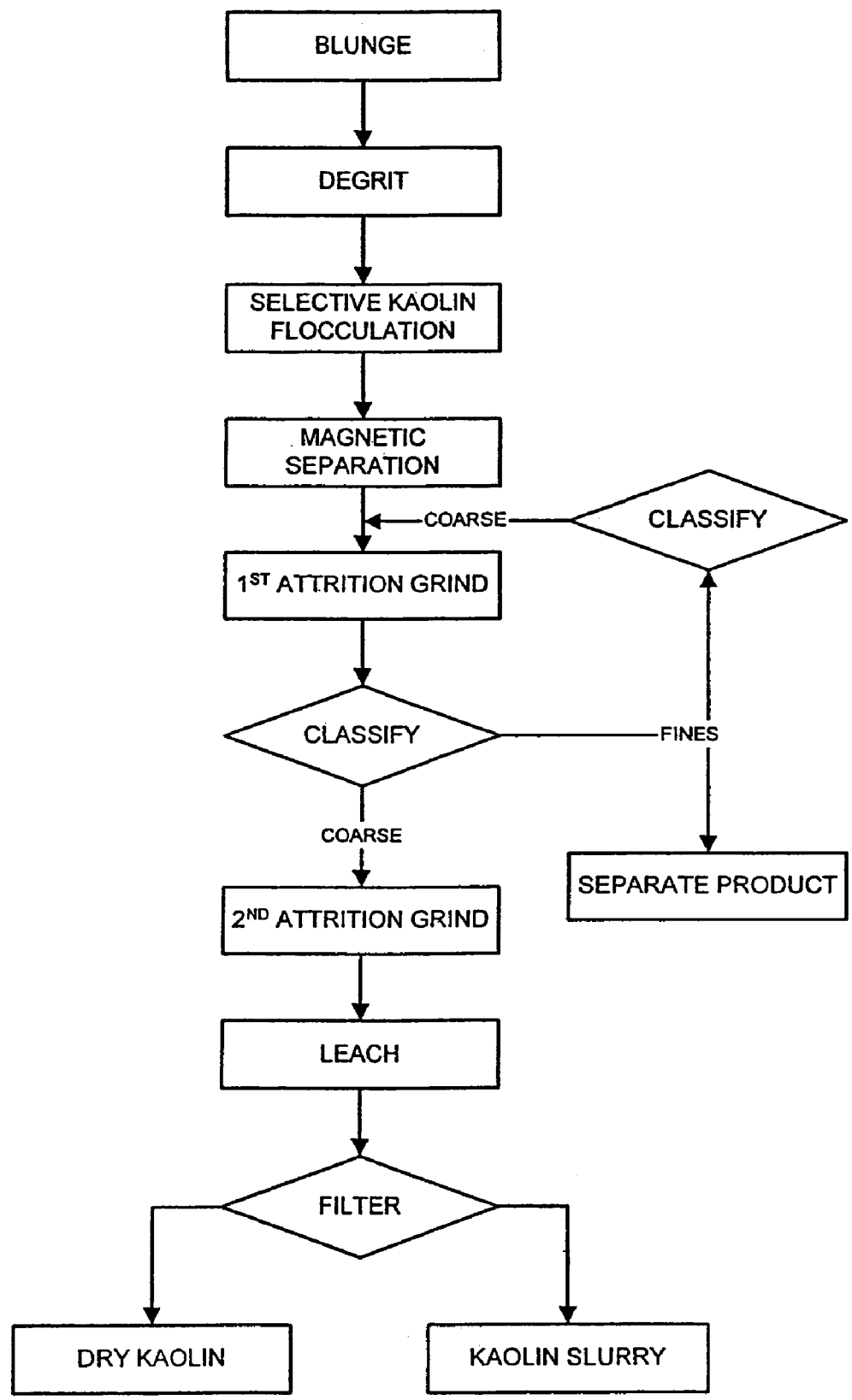
FIG. 3 is a flowchart illustrating a process for refining a coarse fraction kaolin according to Example 3.

This Example provides another process where a Georgia crude kaolin is reblunged and degritted, as illustrated in the flowchart of FIG. 3. After selective flocculation, the kaolin is subjected to magnetic separation. A coarse fraction from a size classification centrifuge is then added to the kaolin prior to a first attrition grinding step. After a size classification, the coarse fraction is subjected to a second attrition grinding step, followed by leaching and filtering to produce a high shape factor product.

| PROCESS PRODUCT | Grinder Feed | Grinder Product | Coarse Fraction | AFTER LEACHING** | Spray Dry | Bird Rejects |
|---|---|---|---|---|---|---|
| % solids | 32.7 | 32.1 | 29.6 | 43.9 | 96.2 | 54.1 |
| Brightness | 84.56 | 85.83 | 85.98 | 87.67 | 87.21 | 82.36 |
| L | 94.6 | 95.02 | 95.08 | 95.5 | 95.25 | 92.64 |
| a | −0.2 | −0.18 | −0.13 | −0.22 | −0.19 | −0.27 |
| b | 4.19 | 3.83 | 3.8 | 3.11 | 3.11 | 3.11 |
| $TiO_2$ | 0.613 | 0.635 | 0.652 | 0.639 | 0.63 | 0.666 |
| $Fe_2O_3$ | 0.394 | 0.406 | 0.43 | 0.385 | 0.375 | 0.382 |
| Brookfield* | | | | | 1360 | |
| Hercules* | | | | | 50 rpm | |
| Panacea | 51.6 | 87.1 | 87.1 | 85.8 | 87.1 | 57.8 |
| PSD <2 m | 48 | 66.3 | 70.9 | 69.3 | 69.7 | 35.8 |
| <1 m | 27.2 | 44.2 | 49.2 | 46.9 | 47.4 | 20.4 |
| <.5 m | 13.6 | 24.3 | 28.3 | 26.3 | 26 | 10.1 |
| <.25 m | 4.8 | 7.8 | 10.6 | 10 | 11.6 | 2.7 |
| Recovery | | 99% | 88.1% | 98% | 99% | 11.9% |

*(60% solids)
**5 lbs/ton sodium hydrosulfite

Example 4

FIG. 4 is a flowchart illustrating a process for making a barrier coating pigment from coarse fraction kaolin prepared according to the method of Example 1, where the barrier coating comprises kaolin having a shape factor of at least about 90:1. 5 gallons of coarse hyperplaty fraction kaolin is obtained in accordance with one of the previously described embodiments of the invention. The slurry is adjusted to have a solids content of 35%. 1 lb/ton C-211 is added, and more can be added if necessary. The batch is subjected to sand grinding to increase the percentage of particles having a size of less than 2 μm by 24% to 26%. 3600 mL sand and 1800 mL clay slip was used. In the final slurry, at least 55% of the solids had a size less than 2 μm.

The slurry was screened on a 325 mesh screen and flocculated to pH=3 with sulfuric acid. After filtering, the filter cake was reblunged with SAPA (a blend of 35% Sodium Polyacrylate and 65% Soda Ash) to pH=6.5. Some of the reblunged filter cake was spray dried and added back to the slip to make a slurry having a solids content of 58% to 60%, but the slurry could optionally be as low as 50% solids or even 45% solids. The table below provides size distribution and shape factor values of the final product.

| | |
|---|---|
| Brightness GE | 85.79 |
| PH | 7.2 |
| 325 m Residue | 0.0071 |
| PSD % <10 μm | 97.2 |
| PSD % <5 μm | 86.5 |
| PSD % <2 μm | 56.0 |
| PSD % <1 μm | 35.4 |
| PSD % <.5 μm | 18 |
| PSD % <.25 μm | 9.7 |
| PSD % <.1 μm | 4 |
| Visc. Brook #2 As Is | 79 |
| Visc. Herc rpm@ 18 dynes | 400 |
| Visc: Solids % | 59.2 |
| Panacea (shape factor) | 92 |

Kaolin samples A-C were tested for grease and oil barrier properties. Samples A and B are known kaolin products whereas sample C is a kaolin product prepared in accordance with the method of Example 1. Barrier coatings were prepared as described in this Example, with these kaolin products.

| | Sample A - Comparative | Sample B - Comparative | Sample C - Invention |
|---|---|---|---|
| PSD % <2 μm | 82.4 | 89.9 | 56.0 |
| Panacea - Shape Factor | 35 | 58.9 | 92 |

Barrier coatings were applied to a 60 g/m² woodfree base sheet with a cylindrical laboratory coater. The coatings comprised the kaolin, calcium carbonate, latex, calcium stearate, and a viscosity modifier. The physical properties of the kaolins can be found in the table, above. The barrier coatings were applied twice on the same paper sample. The coated paper samples were finished on a laboratory scale calender.

The calendered paper samples were evaluated using a 3M Kit test in accordance with TAPPI procedure T559 pm-96 and for oil and grease resistance (OGR) in accordance with TAPPI procedure T509 cm-85. When using these test methods, higher values using the 3M kit are superior, while lower values when testing for oil and grease resistance are superior.

The 3M test kit was developed to determine the effectiveness of fluorochemical treated papers. The tests involve exposing the paper to a series of solution, which contain castor oil, heptane and toluene. There are 12 solutions of levels in the Kit test. As the Kit levels increase the proportion of solvent is larger.

The OGR test involves exposing the coated paper samples to a suitable oil or oil containing compound for a set period of time. The amount of oil that seeps through the coated sample and is absorbed on an underlying blotter is quantified. The test values from the OGR represent that percentage of the blotter paper covered by the oil. Thus, lower values are preferred. OGR values of 3 and less denote fully satisfactory products.

| Sample No. | 3M Kit (Coated) | | OGR | |
|---|---|---|---|---|
| | Flat | Creased | Flat | Creased |
| Sample A | >12 | <3 | 9 | 17 |
| Sample B | >12 | <3 | 11 | 21 |
| Sample C | >12 | <3 | 3 | 5 |

As can be seen from the table above, the sample according to the present invention provides stronger barriers when compared with prior art kaolins. Such results can be attributed to the high shape factor and large plate diameter associated with the kaolins of the present invention.

Example 5

Example 5 illustrates the utility of the inventive kaolin compositions as a component of a paper coating. Paper coating formulations were made up based upon 100 parts of pigment with 14 parts Dow 692 latex binder, 4 parts PROCOTE protein binder, 1.1 parts DISPEX polyacrylate dispersant, $TiO_2$ and kaolin were added as indicated in the Table, below.

| Coating | A | B | C | D | E | F | G |
|---|---|---|---|---|---|---|---|
| Pigment | | | | | | | |
| Prior Art Kaolin | 70 | — | — | — | — | — | — |
| Invention Kaolin 1 | — | 70 | 85 | 100 | — | — | — |
| Invention Kaolin 2 | — | — | — | — | 70 | 85 | 100 |
| $TiO_2$ | 30 | 30 | 15 | — | 30 | 15 | — |
| Dispex | 0.1 | 0.1 | 0.1 | 0.1 | 0.1 | 0.1 | 0.1 |
| Dow 692 | 14 | 14 | 14 | 14 | 14 | 14 | 14 |
| Procote | 4 | 4 | 4 | 4 | 4 | 4 | 4 |
| pH | 8.5 | 8.5 | 8.5 | 8.5 | 8.5 | 8.5 | 8.5 |
| Brookfield Viscosity Spindle #2 | | | | | | | |
| cps@10 rpm | 156 | 96 | 128 | 244 | 60 | 100 | 384 |
| cps@20 rpm | 108 | 68 | 102 | 156 | 48 | 74 | 244 |
| cps@50 rpm | 74 | 60 | 72 | 102 | 49 | 63 | 152 |
| cps@100 rpm | 72 | 63 | 70 | 96 | 53 | 70 | 154 |

The kaolin properties are set forth in the Table below:

| | Prior Art Kaolin | Invention Kaolin 1 | Invention Kaolin 2 |
|---|---|---|---|
| Brightness | 90 | 91 | 92 |
| 2 micron | 91 | 85.6 | 66.7 |
| 0.5 micron | 35 | 34.4 | 18.1 |
| Shape Factor | 15 | 107 | 141 |
| Surface Area | 15 | 15.9 | 11.3 |
| Steepness | 45 | 37 | 33 |

The formulations were drawn down with wire wound rods onto a basestock. The fibrous substrate was coated to a coat weight of 15 gsm. The coatings were air dried and brightness and gloss were measured using Tappi standard methods. The results are set forth in the Table below.

| Coating | A | B | C | D | E | F | G |
|---|---|---|---|---|---|---|---|
| Pigment Level | 15.3 | 15.1 | 15.2 | 15.2 | 15.4 | 15.4 | 15.3 |
| Brightness ISO | | | | | | | |
| Mean | 65.8 | 69.4 | 64.8 | 54.9 | 68.7 | 66.2 | 57.8 |
| St. Dev. | 1.15 | 1.16 | 1.06 | 0.86 | 0.55 | 0.72 | 1.46 |
| St. Error | 0.36 | 0.37 | 0.34 | 0.27 | 0.17 | 0.23 | 0.46 |
| N | 10 | 10 | 10 | 10 | 10 | 10 | 10 |
| Sheet Gloss (75) | | | | | | | |
| Mean | 13.0 | 9.4 | 10.9 | 11.2 | 9.5 | 9.1 | 10.1 |
| St. Dev. | 1.05 | 0.89 | 0.49 | 0.64 | 1.23 | 0.92 | 1.34 |
| St. Error | 0.27 | 0.23 | 0.13 | 0.17 | 0.32 | 0.24 | 0.35 |
| N | 15 | 15 | 15 | 15 | 15 | 15 | 15 |

Figure 5:
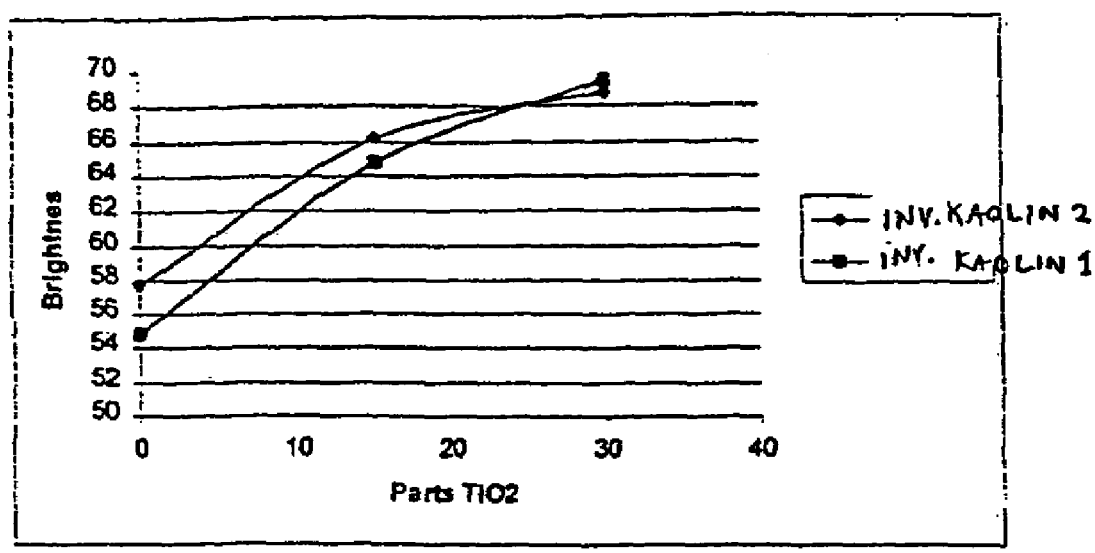
FIG. 5 is a graph illustrating brightness (y-axis) as a function of the $TiO_2$ content (x-axis) for two paper coatings according to the present invention.

Samples according to the present invention exhibited improved brightness at accepted $TiO_2$ levels and comparable brightness at lower $TiO_2$ levels. See FIG. 5 which plots the brightness results noted above as a function of $TiO_2$ content. Paper coated according to the present invention gives high brightness even with $TiO_2$ significantly above the brightness of the uncoated sheet.

Thus, the inventive kaolin compositions are useful in applications wherein a high opacity, brightness or scattering are required, such as in brown board coating applications and may serve to reduce the amount of $TiO_2$ required therein. Further, although the present example illustrates the utility of the inventive kaolin as a paper coating, the composition could also be used to coat other substances wherein a high brightness or opacity coating is needed.

Example 6

To test the utility of the inventive kaolins as a filler, handsheets were prepared from a unbleached natural Kraft which has undergone no refining. While the present example pertains to use as a paper filler, it is anticipated that the inventive kaolins could also be useful as a high opacity filler for plastics and like materials.

The handsheets were made with a TAPPI sheet mold at a pH of 4.5. The sheets were made on a fourdinier paper machine using unbleached hardwood kraft. The conditions are discussed in the table, below.

| | |
|---|---|
| pH | 6.75 |
| Freeness (CSF) | 470 |
| Freeness (CSF) after beating | 380 |
| Britt Fines | |
| % Fiber | 80.3 |
| % Fines | 18.9 |
| % Ash | 0.8 |
| Brightness | 22.7 |
| Specific Conductivity | 1750 |
| Mutek PCD: | −340 |
| Total Dissolved Solids | 2327 ppm |
| Inorganic Dissolved | 1880 ppm |

The handsheets were air dried and a range of properties were measured for unfilled sheets, sheets made using the commercially available prior art pigment ASTRAPLATE (available from Imerys, Inc.) and two sets of samples using the composition identified as Invention Kaolin 2 in Example 5 above. The ASTRAPLATE and Invention 2 Samples included 2 lbs per ton of a commercially available retention aid of a sort that would be readily obtainable by one of ordinary skill in the art.

| | Sample | | | | |
|---|---|---|---|---|---|
| | 1 | 2 | 3 | 4 | 5 |
| Description | Unfilled | Unfilled | Prior Art Astraplate | Invention Kaolin 2 | Invention Kaolin 2 |
| % Ash (450)) | 0.7 | 0.7 | 5.9 | 12.3 | 23.9 |
| % Ash (900) | 2.1 | 0.6 | 4.6 | 12.2 | 21.4 |
| GSM | 53.9 | 51.4 | 52.4 | 51.5 | 52.3 |
| Sheet Brightness | 19.9 | 20.1 | 22.8 | 29.4 | 38.5 |
| Opacity | 88.4 | 88.2 | 90.3 | 94.2 | 96.2 |
| F8 Sheet Scatter | 179 | 220 | 236 | 307 | 524 |
| F8 Absorption | 271.5 | 318.8 | 295.9 | 246.4 | 246.7 |
| F10 Sheet Scatter | 208 | 213 | 241 | 341 | 481 |
| F10 Absorption | 176.1 | 168.7 | 168.3 | 157.6 | 132.7 |
| Pigment Scatter | — | — | 807 | 1073 | 1557 |
| Gurley Porosity | 13.22 | 11.23 | 13.97 | 20.25 | 22.25 |
| Burst Factor | 45.4 | 44.6 | 40.2 | 28.6 | 17.2 |
| Sheffield Smoothness | 293 | 277 | 276 | 261 | 252 |

Example 7

Filled paper was made using a bleached hardwood, softwood mixture beaten to a 400 Canadian Standard Freeness (CSF), a retention aid, and Invention Kaolin 2 of Example 5. The pH was maintained at 5.0. Handsheet were made and allowed to air dry. A range of properties were measured.

| | Sample | | | |
|---|---|---|---|---|
| | 1 | 2 | 3 | 4 |
| Description | Unfilled | Invention Kaolin 2 | Invention Kaolin 2 | Invention Kaolin 2 |
| Retention Aid in Toms | 1 | 1 | 1 | 1 |
| Headbox % Ash (450)) | — | 7.62 | 21.12 | 28.13 |
| % Retention on (450) | — | 85 | 58.2 | 74.1 |
| Handsheet % | — | 6.48 | 12.29 | 20.84 |

-continued

| | Sample | | | |
|---|---|---|---|---|
| | 1 | 2 | 3 | 4 |
| Description | Unfilled | Invention Kaolin 2 | Invention Kaolin 2 | Invention Kaolin 2 |
| Ash (450) | | | | |
| GSM | 58.6 | 59.2 | 57.5 | 57.4 |
| Sheet Brightness | 83.8 | 85.3 | 85.9 | 86.7 |
| Opacity | 73.9 | 79.5 | 83.1 | 87.2 |
| Sheet Scatter | 351 | 457 | 541 | 695 |
| Absorption | 4.9 | 5.8 | 6.3 | 7.1 |
| Caliper | 3.839 | 3.851 | 3.788 | 3.736 |
| Bulk | 1.66 | 1.65 | 1.67 | 1.65 |
| Pigment Scatter | — | 1987 | 1897 | 2002 |
| Gurley Porosity | 7.9 | 10.2 | 9.3 | 14.2 |
| Sheffield Smoothness | 271293 | 251 | 244 | 206 |

As can be seen from the table above, the pigment light scatter according to the present invention (1900–2000 cm$^2$/g) compares favorably with that which can be achieved using calcined clay at 2500 and standard filler clay at 1100.

Example 8

In this example, a series of coarse fractions, i.e., "b-fraction" clays were subjected to attrition grinding to determine which clays result in high shape factor extenders while retaining particle size. The properties of the resulting materials were assessed to determine which materials provided high opacity and low sheen in a high PVC paint formulation.

Carbolite grinding experiments with fine (20–40 lbs) Carbolite grinding media were performed on four materials: (1) Invention Kaolin 3, (see column 0), having a coarse, platy character; (2) Invention Kaolin 4 from a Bird centrifuge, having a coarser, platy character (see column 0); (3) a Georgia feed clay (DBK 110 Contour 100, Imerys), a Dry Branch feed clay; and (4) a fine particle size clay (K20, Imerys), a Kaopaque 20 product that had already been processed to a fine particle size. Physical properties of the ground clay are shown in the Table, below.

Physical Properties of the Ground Clays

| | Invention Kaolin 3 | | | | Invention Kaolin 4 | | | |
|---|---|---|---|---|---|---|---|---|
| Energy kwh/t | 0 | 50 | 100 | 150 | 0 | 50 | 100 | 1560 |
| Colour | | | | | | | | |
| ISO B'ness | 81.5 | 84.7 | 85.7 | 86.5 | 74.7 | 75.7 | 75.4 | 75.7 |
| Yellowness | 6.9 | 5.8 | 5.6 | 4.8 | 8.3 | 8.7 | 9.1 | 8.9 |
| L* | 94.8 | 95.8 | 96.1 | 96.2 | 92.2 | 92.8 | 92.8 | 92.9 |
| a* | 0.24 | −0.05 | 0.03 | −0.13. | 0.77 | 0.62 | 4 | 0.54 |
| b* | 4.54 | 3.88 | 3.64 | 3.22 | 5.57 | 5.89 | 6.12 | 6.01 |
| Sedigraph | | | | | | | | |
| <10 μm | 92.5 | 98.9 | 98.7 | 99.5 | 87.6 | 99.2 | 98.7 | 99 |
| <8 μm | 86.9 | 97.8 | 98.6 | 98.8 | 72.6 | 98.5 | 98.3 | 98.4 |
| <5 μm | 86.6 | 91.5 | 96.7 | 97.1 | 64.5 | 96.3 | 96.3 | 96.5 |
| <2 μm | 27.5 | 62.9 | 79.1 | 83.1 | 28.3 | 76.7 | 81 | 83.7 |
| <1 μm | 18 | 41.8 | 59.6 | 64.8 | 19 | 53.3 | 62.6 | 67 |
| <0.75 μm | 14.9 | 33.8 | 50.8 | 57.3 | 16.3 | 44.8 | 55.4 | 59.5 |
| <0.50 μm | 11.1 | 23.3 | 35.4 | 43 | 13.1 | 32.3 | 42.3 | 45.6 |
| <0.25 μm | 5.8 | 10.1 | 13.7 | 17.2 | 7 | 15.1 | 17.3 | 18.7 |
| <0.10 μm | 1.9 | 4.7 | 3.1 | 5.3 | 1.7 | 5.7 | 4.1 | 5.2 |
| d50 | 2.94 | 1.22 | 0.77 | 0.64 | 3.01 | 0.86 | 0.67 | 0.6 |

-continued

|  | Invention Kaolin 3 | | | | Invention Kaolin 4 | | | |
|---|---|---|---|---|---|---|---|---|
| Energy kwh/t | 0 | 50 | 100 | 150 | 0 | 50 | 100 | 1560 |
| Steepness* | 32 | 30 | 32 | 31 | 27 | 30 | 29 | 31 |
| S.F.† | 28.8 | 89 | 96 | 98.8 | 18.7 | 101 | 103 | 98.3 |
| S.A.‡ | 7.49 | | 13.22 | | 9.52 | | 13.48 | |

*Steepness is given by d30/d70* 100. Increasing steepness indicates a narrower PSD.
†S.F. = Shape factor
‡S.A. = Surface area

|  | Georgia Feed Clay | | | | Fine Particle Size Clay | | | |
|---|---|---|---|---|---|---|---|---|
| Energy kwh/t | 0 | 50 | 100 | 150 | 0 | 50 | 100 | 150 |
| Colour | | | | | | | | |
| ISO B'ness | 81.6 | 84.2 | 84.5 | 85 | 84.4 | 85.8 | 85.8 | 86.3 |
| Yellowness | 7.9 | 6.7 | 6.5 | 6.1 | 6.4 | 5.6 | 5.7 | 5.3 |
| L* | 95.1 | 95.8 | 95.9 | 96 | 95.8 | 96.1 | 96.1 | 96.2 |
| a* | 0.16 | 0.02 | 0 | −0.03 | 0.08 | 0.02 | 0.02 | −0.03 |
| b* | 5.21 | 4.39 | 4.27 | 4 | 4.17 | 3.67 | 3.7 | 3.48 |
| Sedigraph | | | | | | | | |
| <10 μm | 90.4 | 98.5 | 99.6 | 99.2 | 99.6 | 99.9 | 99.8 | 99.3 |
| <8 μm | 86.9 | 98.3 | 99 | 98.8 | 99.2 | 99.9 | 99.9 | 99.4 |
| <5 μm | 78.8 | 97.1 | 98 | 99 | 95.5 | 99.2 | 99 | 99.3 |
| <2 μm | 55.6 | 84.4 | 87.8 | 93.4 | 79.7 | 91.4 | 92 | 95.2 |
| <1 μm | 42.1 | 65.5 | 69 | 81.2 | 63.9 | 78.5 | 79.5 | 86.1 |
| <0.75 μm | 36.1 | 54.9 | 58.7 | 72.8 | 57 | 72.1 | 72.1 | 80.4 |
| <0.50 μm | 27.4 | 39.7 | 43.1 | 56.3 | 45.7 | 59 | 58.4 | 68.2 |
| <0.25 μm | 13.4 | 20.54 | 21.3 | 25.7 | 25 | 32.8 | 31.8 | 39.2 |
| <0.10 μm | 5.7 | 9 | 7.4 | 8.8 | 10.4 | 12.6 | 12.8 | 15.9 |
| d50 | 1.4 | 0.65 | 0.59 | 0.44 | 0.6 | 0.4 | 0.41 | 0.32 |
| Steepness | 19 | 31 | 33 | 38 | 25 | 31 | 32 | 35 |
| S.F. | 7.3 | 37.5 | 37.5 | 42 | 29.9 | 45.7 | 44.3 | 43.5 |

*Steepness is given by d30/d70* 100. Increasing steepness indicates a narrower PSD.
†S.F. = Shape factor
‡S.A. = Surface area Other Properties Rheology In all cases Carbolite grinding had a small but significant effect on the rheology. As the grinding energy input increased there was an increase in both the Brookfield and Rotothinner viscosities, while the high shear (cone and plate) viscosity did not change.

Scrub and Stain Resistance

As expected, scrub and stain resistances worsened as the opacity increased.

Color

The ground Invention Kaolin 3 had good color, better than the existing fine particle size clay product. Further improvements may be possible through bleaching of the ground clay.

Conclusions

The light Carbolite grinding of Invention Kaolin 3 can provide a product comprising a coarse, high shape factor clay giving a combination of low sheen with significant opacity improvements. These results reflect the performance of a small batch of material. The more highly ground Invention Kaolin 3 can have a fine high shape factor clay giving large opacity improvements, at the cost of increased sheen. Such a product may offer an alternative to calcined clays in formulations where high scrub resistance is not regarded as important.

Opacity and Sheen

Figure 6:
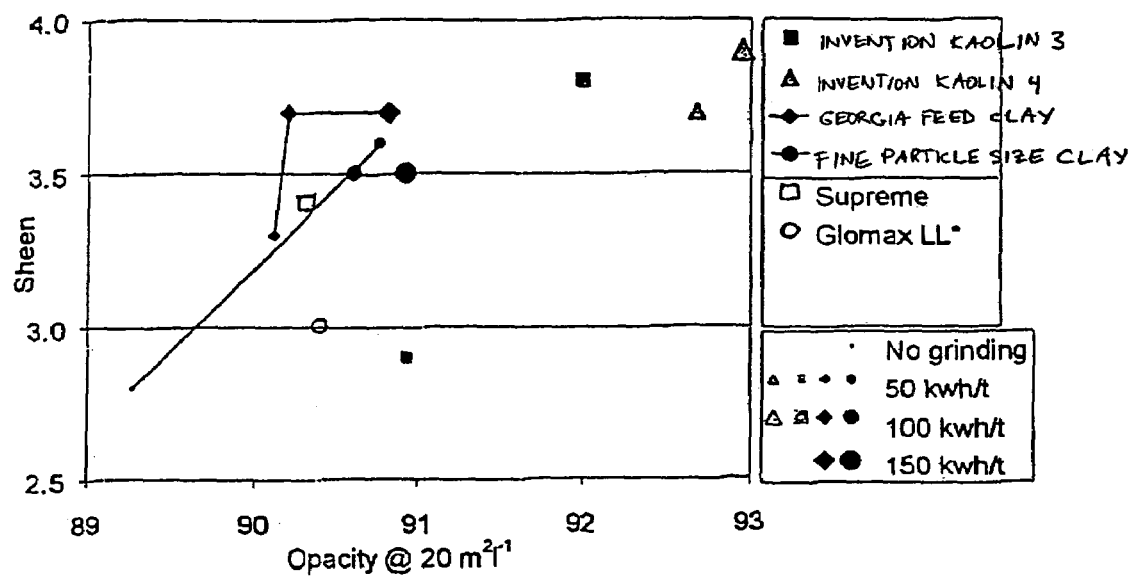
FIG. 6 is a graph illustrating sheen (y-axis) versus opacity (x-axis) of various ground U.S. clays.

FIG. 6 presents the opacity and sheen of the ground clays in the high PVC formulation. The clays were prepared by grinding with fine Carbolite media. The grinding energy is indicated by the size of each point. To allow comparison some standard clays (SUPREME and GLOMAX LL*, all of which are Imerys clay products) are plotted.

Invention Kaolin 3

The 50 kwh/t ground Invention Kaolin 3 rejects gave a noteworthy combination of high opacity and low sheen.

The 100 kwh/t ground Invention Kaolin 3 gave high opacity with high sheen.

Other Feeds

Invention Kaolin 4 had a poor color, a substantial part of their opacity originated from absorption, rather than scattering of light. They also ground to a finer particle size than Invention Kaolin 3, resulting in higher sheen.

A 1.5 unit increase in opacity was achievable by Carbolite grinding of the fine particle size clay feed material. Similar opacities were obtained with the ground Georgia Feed Clay. For these materials, any increase in opacity was always accompanied by a significant increase of the sheen, brought about by a decreasing particle size.

Chemical and mineralogical analysis of the US feed clays are provided in the Table below.

Chemical and Mineralogical Analysis of the Clays Used in Example 8

|  | Invention Kaolin 3 | Invention Kaolin 4 | Georgia Feed Clay | Fine particle size clay |
|---|---|---|---|---|
| XRF Analysis | | | | |
| SiO₂ | 45.08 | 44.93 | 46.51 | 46.49 |
| Al₂O₃ | 39.54 | 38.91 | 37.79 | 37.91 |
| Fe₂O₃ | 0.29 | 0.61 | 0.33 | 0.44 |
| TiO₂ | 0.89 | 1.42 | 1.24 | 1.05 |
| CaO | 0.05 | 0.01 | 0.05 | 0.05 |
| MgO | <.01 | 0.02 | 0.04 | 0.05 |
| K₂O | 0.23 | 0.56 | 0.04 | 0.05 |
| Na₂O | 0.14 | 0.21 | 0.09 | 0.09 |
| L.O.I. | 13.79 | 13.33 | 13.91 | 13.88 |
| XRD Analysis | | | | |
| Kaolin | 98 | 94 | 99 | 98 |
| Mica | 2 | 6 | 1 | 2 |
| Quartz | <0.5 | <0.5 | 0 | 0 |
| Feldspar | 0 | 0 | 0 | 0 |

Figure 7:
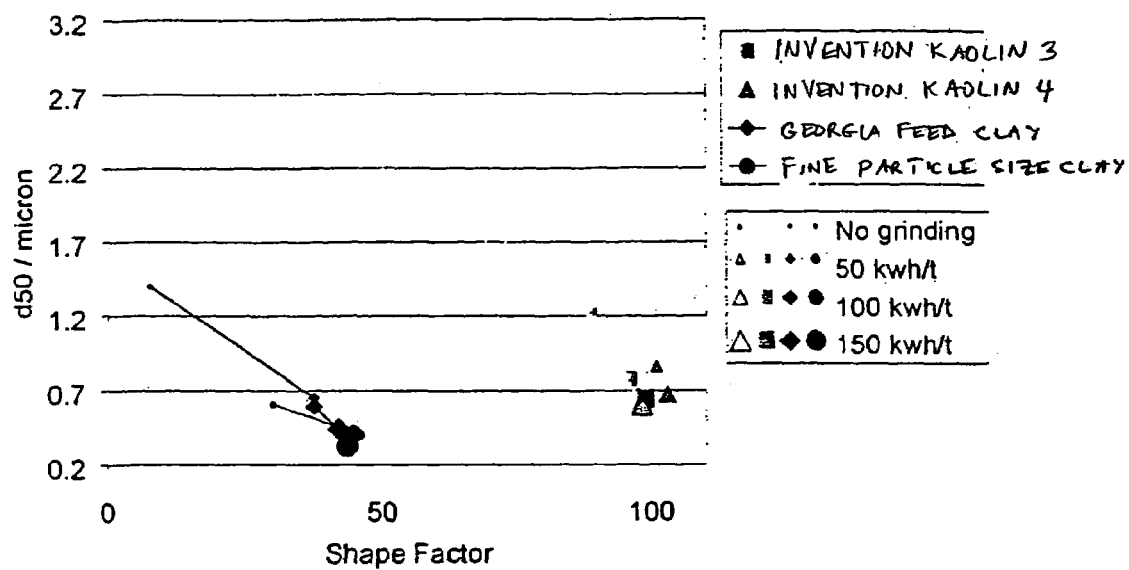
FIG. 7 illustrates a plot of the d50 (y-axis) versus shape factor (x-axis) for Invention Kaolin 3 and Invention Kaolin 4 compared to two prior art kaolins.

FIG. 7 is a plot of the $d_{50}$ versus shape factor. For each of the four feeds, the Carbolite grinding resulted in an increase in the clay's shape factor, and a decrease in the mean particle size. From FIG. 7, it can be seen that Invention Kaolin 3 and Invention Kaolin 4 yielded the highest shape factors. Invention Kaolin 4 suffered from poor color, with an ISO brightness of 75.7.

Example 9

The ground products of Example 8 were tested in a series of paints using a generic high PVC paint formulation, as exemplified in the Table below.

| Simplified matt paint formulation. | | |
|---|---|---|
| | Weight % | Weight/ pounds per US gallon |
| Tipure R706 TiO$_2$ | 9.0 | 1.11 |
| Extender | 10.0 | 1.23 |
| Carbital 120 | 30.0 | 3.70 |
| Dispex N40 | 0.35 | 0.04 |
| Calgon S | 0.05 | 0.01 |
| Ammonia 0.880 | 0.15 | 0.02 |
| Natrosol 250 MBR | 0.3 | 0.04 |
| Nopco NXZ | 0.3 | 0.04 |
| Proxel GXL | 0.1 | 0.01 |
| Propylene Glycol | 2.0 | 0.25 |
| Texanol | 1.4 | 0.17 |
| Acronal 290D latex | 13.0 | 1.60 |
| Primal TT935 | 0.8 | 0.10 |
| Water | 32.55 | 4.02 |
| Total = | 100.00 | |
| % PVC | | 74.09 |
| Specific gravity, g/cm$^3$ | | 1.479 |
| Solids wt. % | | 56.25 |
| Solids vol. % | | 34.35 |

The opacity, gloss, stain resistance, BS scrub loss and mud crack resistance values are shown in the Table below.

Comparison of the Carbolite Ground US Clays as Extenders

| | Paint No. | | | | | |
|---|---|---|---|---|---|---|
| | 154 | 159 | 160 | 161 | 162 | 163 |
| Extender | Supreme | G.F.C.** | G.F.C | G.F.C | I.K.4* | I.K.4 |
| Work/kwh/t | — | 50 | 100 | 150 | 50 | 100 |
| Brookfield viscosity, poise | | | | | | |
| @ 1 r.p.m. | 2960 | 1250 | 1340 | 1580 | 1160 | 1270 |
| @ 10 r.p.m. | 430 | 202 | 214 | 239 | 182 | 213 |
| @ 100 r.p.m. | 65.4 | 42.2 | 42.5 | 44.7 | 40 | 43.8 |
| Rotothinner, poise | 12.1 | 9.7 | 9.9 | 10 | 10.4 | 10.6 |
| Cone & Plate, poise | 1.4 | 1.2 | 1.2 | 1.2 | 1.3 | 1.3 |
| Opacity @ 20 m$^2$/l | 90.3 | 90.1 | 90.2 | 90.8 | 92.7 | 93.0 |
| S, mm$^{-1}$ | 78.2 | 76.1 | 76.6 | 80.3 | 90.1 | 92.0 |
| K, mm$^{-1}$ | 0.3 | 0.4 | 0.4 | 0.4 | 0.7 | 0.7 |
| Gloss @ 60° | 3 | 3.3 | 3.3 | 3.2 | 2.9 | 2.9 |
| Gloss @ 85° | 3.4 | 3.3 | 3.7 | 3.7 | 3.7 | 3.9 |
| L* | 96.39 | 96.22 | 96.25 | 96.28 | 95.39 | 95.34 |
| a* | −0.68 | −0.39 | −0.38 | −0.4 | 0.03 | 0.05 |
| b* | 2.21 | 3.38 | 3.37 | 3.24 | 3.78 | 4 |
| Stain resistance, % | 83.4 | 80.6 | 79.2 | 80.0 | 72.9 | 73.4 |
| BS scrub loss†, mg cm$^{-2}$ | 5.80 | 6.24 | 6.26 | 6.34 | 8.14 | 8.17 |
| Mud crack resistance, μm | 1500 | 1350 | 1350 | 1500 | 1500 | 1400 |

*I.K.4 = Invention Kaolin 4
**G.F.C = Georgia Feed Clay
†BS scrub loss, 100 cycles, 7 days

| | Paint No. | | | | | |
|---|---|---|---|---|---|---|
| | 164 | 165 | 155 | 156 | 157 | 158 |
| Extender | I.K.3‡ | I.K.3 | F.P.S.C.* | F.P.S.C. | F.P.S.C. | F.P.S.C. |
| Work/kwh/t | 50 | 100 | 0 | 50 | 100 | 150 |
| Brookfield viscosity, poise | | | | | | |
| @ 1 r.p.m. | 1220 | 1370 | 1190 | 1470 | 1520 | 1730 |
| @ 10 r.p.m. | 189 | 210 | 209 | 249 | 246 | 277 |
| @ 100 r.p.m. | 42 | 43.5 | 44.6 | 45.8 | 46 | 50.5 |
| Rotothinner, poise | 10.2 | 10.3 | 10 | 10.4 | 10.4 | 10.6 |
| Cone & Plate, poise | 1.2 | 1.3 | 1.3 | 1.3 | 1.2 | 1.3 |
| Opacity @ 20 m$^2$/l | 90.9 | 92.0 | 89.3 | 90.8 | 90.6 | 90.9 |
| S, mm$^{-1}$ | 81.9 | 89.6 | 71.7 | 80.0 | 79.0 | 81.1 |

-continued

| | Paint No. | | | | | |
|---|---|---|---|---|---|---|
| | 164 | 165 | 155 | 156 | 157 | 158 |
| K, mm$^{-1}$ | 0.3 | 0.3 | 0.4 | 0.4 | 0.4 | 0.4 |
| Gloss @ 60° | 3.3 | 3.3 | 3.2 | 3 | 3.3 | 3.1 |
| Gloss @ 85° | 2.9 | 3.8 | 2.8 | 3.6 | 3.5 | 3.5 |
| L* | 96.71 | 96.86 | 96.19 | 96.32 | 96.32 | 96.4 |
| a* | −0.43 | −0.44 | −0.41 | −0.42 | −0.42 | −0.37 |
| b* | 2.62 | 2.48 | 3.25 | 3.03 | 3.05 | 2.96 |
| Stain resistance, % | 73.3 | 72.3 | 82.5 | 80.1 | 81.9 | 82.5 |
| BS scrub loss†, mg cm$^{-2}$ | 7.19 | 7.96 | 5.66 | 6.67 | 6.58 | 7.02 |
| Mud crack resistance, μm | 1350 | 1500 | 1350 | 1050 | 1500 | 1150 |

‡I.K.3 = Invention Kaolin 3
*F.P.S.C. = fine particle size clay

In all cases, Carbolite grinding had a small but significant effect on the rheology. As the grinding energy input increased, there was an increase in both the Brookfield and Rotothinner viscosities, while the high shear (cone and plate) viscosity did not change.

Scrub and stain resistances worsened as the opacity increased.

Invention Kaolin 3 had good color in that it is better than that of the existing fine particle size clay product.

Example 10

Figure 8:
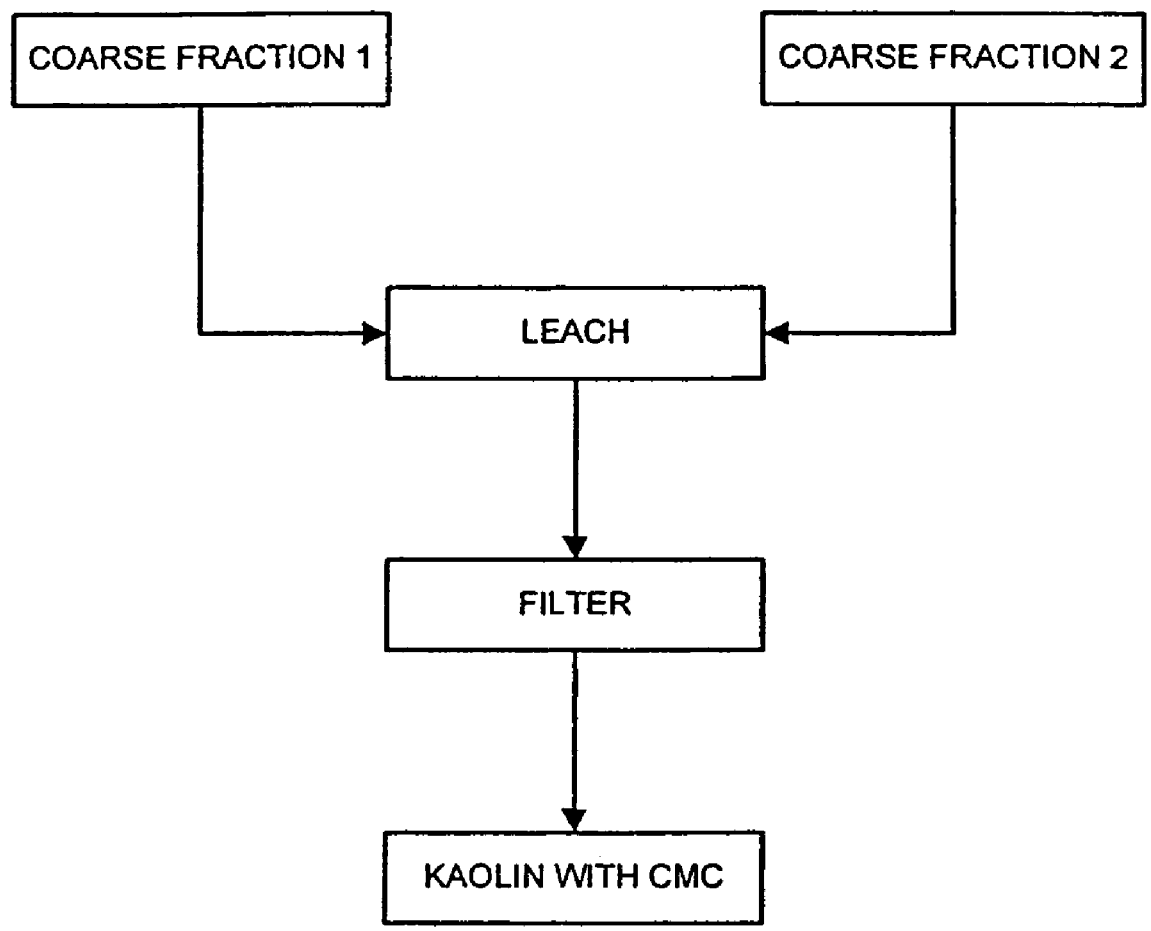
FIG. 8 is a flowchart illustrating a process for refining a coarse fraction kaolin according to Example 10.

FIG. 8 is a flowchart outlining a process where two coarse fractions are combined, followed by leaching and filtering to produce a stabilized high-solids slurry by adding a stabilizing agent such as carboxymethlycellulose or a smecite clay (i.e. bentonite, hectorite, montmorillonite, etc.). To illustrate this, a two tote sized samples (~250–300 gallons) of the inventive product of Example 9 were made down by blunging with a 65/35 SAPA (soda ash/sodium polyacrylate) dispersant package to a pH of 6.5. The two sample totes of the product were each treated with biocide (1 lb/dry tonne Proxel) then treated with 8 lbs/dry tonne of the carboxymethylcellulose PE-30 EX. The final solids content of Sample 1 was 52% and the final solids content of sample 2 was 49.6%. The initial Hercules viscosity of samples 1 and 2 were measured using a no. 2 spindle at 20 rpm and found to be 30 cps and 18 cps respectively. The initial Hercules viscosity of sample 1 was measured as 8.5 dynes at 4400 rpm at pH 7.2 and the initial Hercules viscosity of sample 2 was measured as 5.0 dynes at pH 7.0.

Next, the stability over time of the slurries was measured and the results are displayed in the following table. One pint samples were set aside and allowed to settle for a desired amount of time, after which the Brookfield viscosity of the top and bottom portion of each sample was measured using a 'T' bar at ½ rpm. If the slurry was not stable, one would expect the measured viscosity to rise over time to a maximum value of approximately 400,000.

| Sample Loc. | 0 Day | 14 Day | 21 Day | 28 Day |
|---|---|---|---|---|
| Sample 1 - Top | 6,800 | 16,000 | 15,200 | 14,000 |
| Sample 1 - Bottom | 6,800 | 18,000 | 22,400 | 21,200 |
| Sample 2 - Top | 6,000 | 14,400 | 14,400 | 14,000 |
| Sample 2 - Bottom | 6,000 | 14,800 | 16,400 | 17,600 |

At the end of the 28 day test period, each one pint sample was subjected to a pour test wherein it was upended and allowed to pour for 1 minute. In this time approximately 93.4% sample 1 and 94.9% of sample 2 was seen to pour from the container, illustrating the continued fluidity of the sample. A similar test performed on each entire tote (~250–300 gallons) of samples 1 and 2 resulted in 99.7% and 99.2% pouring respectively. As can be seen from the pour test results and the above table, the CMC stabilized slurry is basically stable, which is surprising in light of the fact that the make down process with CMC results in an effective decrease in the slurry solids. Generally this process should be useful in relation to slurries having a solids content, for example, in the range of greater than about 45%, between about 45% and about 60%, or even in the range of about 50 to about 60%.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method of making a coated paper comprising:
    coating a fibrous substrate with a paper coating composition comprising a kaolin having a shape factor of at least about 70:1.

2. The method according to claim 1, wherein the kaolin has a shape factor of at least about 80:1.

3. The method according to claim 1, wherein the kaolin has a shape factor of at least about 90:1.

4. The method according to claim 1, wherein the kaolin has a shape factor of at least about 100:1.

5. A method of making a filled paper comprising
providing a fibrous substrate;
adding to said substrate kaolin having a shape factor of at least about 70:1.

6. The method according to claim 5, further comprising adding a retention aid.

7. The method according to claim 5, wherein the kaolin has a shape factor of at least about 80:1.

8. The method according to claim 5, wherein the kaolin has a shape factor of at least about 90:1.

9. The method according to claim 5, wherein the kaolin has a shape factor of at least about 100:1.

10. A coated paper comprising:
a fibrous substrate; and
a coating on said substrate comprising kaolin having a shape factor of at least about 70:1.

11. The coated paper according to claim 10, wherein the kaolin has a shape factor of at least about 80:1.

12. The coated paper according to claim 10, wherein the kaolin has a shape factor of at least about 90:1.

13. The coated paper according to claim 10, wherein the kaolin has a shape factor of at least about 100:1.

14. A method of improving barrier properties in paper comprising:
coating a fibrous substrate with a coating composition comprising kaolin having a shape factor of at least about 70:1.

15. The method according to claim 14, wherein said coating further comprises a binder.

16. The method according to claim 15, wherein said binder is a latex binder.

17. The method according to claim 15, wherein said binder is present in an amount ranging from about 40% to about 50% by weight.

18. The method according to claim 14, wherein the kaolin has a shape factor of at least about 80:1.

19. The method according to claim 14, wherein the kaolin has a shape factor of at least about 90:1.

20. The method according to claim 14, wherein the kaolin has a shape factor of at least about 100:1.

21. A barrier coating composition for paper or paperboard, comprising a slurry comprising kaolin having a shape factor of at least about 70:1, the solids content of the slurry ranging from about 45% to about 70%.

22. The barrier coating composition according to claim 21, wherein the kaolin has a shape factor of at least about 80:1.

23. The barrier coating composition according to claim 21, wherein the kaolin has a shape factor of at least about 90:1.

24. The barrier coating composition according to claim 21, wherein the kaolin has a shape factor of at least about 100:1.

25. A paper coating composition for paper or paperboard, comprising:
kaolin having a shape factor of at least about 70:1; and
a binder,
wherein the composition has a solids content of at least about 60%.

26. The paper coating composition according to claim 25, further comprising at least one additional pigment.

27. The paper coating composition according to claim 26, wherein the at least one additional pigment is $TiO_2$.

28. The paper coating composition according to claim 27, wherein the composition has a ratio of kaolin to $TiO_2$ of less than about 85:15 parts by weight.

29. The paper coating composition according to claim 25, wherein the composition has a solids content of at least about 70%.

30. The paper coating composition according to claim 25, further comprising at least one dispersant.

31. A filler composition for paper or paperboard comprising kaolin having a shape factor of at least about 70:1.

32. The filler composition according to claim 31, wherein the kaolin has a shape factor of at least about 80:1.

33. The filler composition according to claim 31, wherein the kaolin has a shape factor of at least about 90:1.

34. The filler composition according to claim 31, wherein the kaolin has a shape factor of at least about 100:1.

* * * * *